(12) United States Patent
Eliaz

(10) Patent No.: US 8,572,458 B1
(45) Date of Patent: Oct. 29, 2013

(54) FORWARD ERROR CORRECTION WITH PARITY CHECK ENCODING FOR USE IN LOW COMPLEXITY HIGHLY-SPECTRALLY EFFICIENT COMMUNICATIONS

(71) Applicant: MagnaCom Ltd., Moshav Ben Shemen (IL)

(72) Inventor: Amir Eliaz, Moshav Ben Shemen (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 13/755,068

(22) Filed: Jan. 31, 2013

Related U.S. Application Data

(60) Provisional application No. 61/662,085, filed on Jun. 20, 2012, provisional application No. 61/726,099, filed on Nov. 14, 2012, provisional application No. 61/729,774, filed on Nov. 26, 2012, provisional application No. 61/747,132, filed on Dec. 28, 2012.

(51) Int. Cl.
*H03M 13/00* (2006.01)
(52) U.S. Cl.
USPC .......................................................... 714/756
(58) Field of Classification Search
USPC .......................................................... 714/756
See application file for complete search history.

(56) References Cited

U.S. PATENT DOCUMENTS 4,109,101 A * 8/1978 Mitani ........................... 375/280
5,818,653 A * 10/1998 Park et al. ........................ 360/32
5,930,309 A * 7/1999 Knutson et al. ................. 375/340
2002/0016938 A1 * 2/2002 Starr ............................... 714/701
2007/0127608 A1 * 6/2007 Scheim et al. .................. 375/346

OTHER PUBLICATIONS

S. Mita, M. Izumita, N. Doi, and Y. Eto, "Automatic equalizer for digital magnetic recording systems" IEEE Trans. Magn., vol. 25, pp. 3672-3674, 1987.
E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.
W. E. Ryan and A. Gutierrez, "Performance of adaptive Volterra equalizers on nonlinear magnetic recording channels," IEEE Trans. Magn., vol. 31, pp. 3054-3056, Nov. 1995.
X. Che, "Nonlinearity measurements and write precompensation studies for a PRML recording channel," IEEE Trans. Magn., vol. 31, pp. 3021-3026, Nov. 1995.

(Continued)

*Primary Examiner* — Joseph D Torres
(74) *Attorney, Agent, or Firm* — McAndrews, Held & Malloy, Ltd.

(57) ABSTRACT

A transmitter inserts parity samples into a stream of information symbols in an inter-symbol correlated (ISC) signal. The inserted parity samples may be utilized to generate estimates of corresponding information symbols when they are received by a receiver. The information symbols may be pulse shaped by a first pulse shaping filter characterized by a first response. The parity samples may be pulsed shaped by a second pulse shaping filter characterized by a second response. The first response and the second response are diverse or uncorrelated. The transmitter may transmit the ISC signal comprising the pulse shaped information symbols and the pulse shaped parity samples. The parity samples may be generated utilizing a non-linear function over a plurality of the information symbols. The non-linear function may be diverse from a partial response signal convolution corresponding to the information symbols and is designed according to a desired SNR value at the receiver.

18 Claims, 17 Drawing Sheets

(56) References Cited

OTHER PUBLICATIONS

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Equalization: The Correction and Analysis of Degraded Signals, White Paper, Agilent Technologies, Ransom Stephens V1.0, Aug. 15, 2005 (12 pages).

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G.D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog•Iu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

* cited by examiner

FORWARD ERROR CORRECTION WITH PARITY CHECK ENCODING FOR USE IN LOW COMPLEXITY HIGHLY-SPECTRALLY EFFICIENT COMMUNICATIONS

CROSS-REFERENCE TO RELATED APPLICATIONS/INCORPORATION BY REFERENCE

This patent application makes reference to, claims priority to and claims benefit from:

U.S. Provisional Patent Application Ser. No. 61/662,085 entitled "Apparatus and Method for Efficient Utilization of Bandwidth" and filed on Jun. 20, 2012;

U.S. Provisional Patent Application Ser. No. 61/726,099 entitled "Modulation Scheme Based on Partial Response" and filed on Nov. 14, 2012;

U.S. Provisional Patent Application Ser. No. 61/729,774 entitled "Modulation Scheme Based on Partial Response" and filed on Nov. 26, 2012; and U.S. Provisional Patent Application Ser. No. 61/747,132 entitled "Modulation Scheme Based on Partial Response" and filed on Dec. 28, 2012.

This application also makes reference to:

U.S. patent application Ser. No. 13/754,964 titled "Low-Complexity, Highly-Spectrally-Efficient Communications," and filed on the same date as this application;

U.S. patent application Ser. No. 13/754,998 titled "Design and Optimization of Partial Response Pulse Shape Filter," and filed on the same date as this application;

U.S. patent application Ser. No. 13/755,001 titled "Constellation Map Optimization For Highly Spectrally Efficient Communications," and filed on the same date as this application;

U.S. patent application Ser. No. 13/755,008 titled "Dynamic Filter Adjustment for Highly-Spectrally-Efficient Communications," and filed on the same date as this application;

U.S. patent application Ser. No. 13/755,011 titled "Timing Synchronization for Reception of Highly-Spectrally-Efficient Communications," and filed on the same date as this application;

U.S. patent application Ser. No. 13/755,018 titled "Feed Forward Equalization for Highly-Spectrally-Efficient Communications," and filed on the same date as this application;

U.S. patent application Ser. No. 13/755,021 titled "Decision Feedback Equalizer for Highly-Spectrally-Efficient Communications," and filed on the same date as this application;

U.S. patent application Ser. No. 13/755,025 titled "Decision Feedback Equalizer with Multiple Cores for Highly-Spectrally-Efficient Communications," and filed on the same date as this application;

U.S. patent application Ser. No. 13/755,026 titled "Decision Feedback Equalizer Utilizing Symbol Error Rate Biased Adaptation Function for Highly-Spectrally-Efficient Communications," and filed on the same date as this application;

U.S. patent application Ser. No. 13/755,028 titled "Coarse Phase Estimation for Highly-Spectrally-Efficient Communications," and filed on the same date as this application;

U.S. patent application Ser. No. 13/755,039 titled "Fine Phase Estimation for Highly Spectrally Efficient Communications," and filed on the same date as this application;

U.S. patent application Ser. No. 13/755,043 titled "Joint Sequence Estimation of Symbol and Phase with High Tolerance of Nonlinearity," and filed on the same date as this application; and U.S. patent application Ser. No. 13/755,060 titled "Method and System for Forward Error Correction Decoding with Parity Check for Use in Low Complexity Highly-Spectrally Efficient Communications," and filed on the same date as this application.

Each of the above referenced application is hereby incorporated herein by reference in its entirety.

FIELD OF THE DISCLOSURE

Certain embodiments of the disclosure relate to wired and/or wireless communications. More specifically, certain embodiments of the disclosure relate to a method and system for forward error correction with parity check encoding for use in low complexity highly-spectrally efficient communications.

BACKGROUND OF THE DISCLOSURE

Conventional communication systems are overly power hungry and/or spectrally inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for forward error correction with parity check encoding for use in low complexity highly-spectrally efficient communications, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
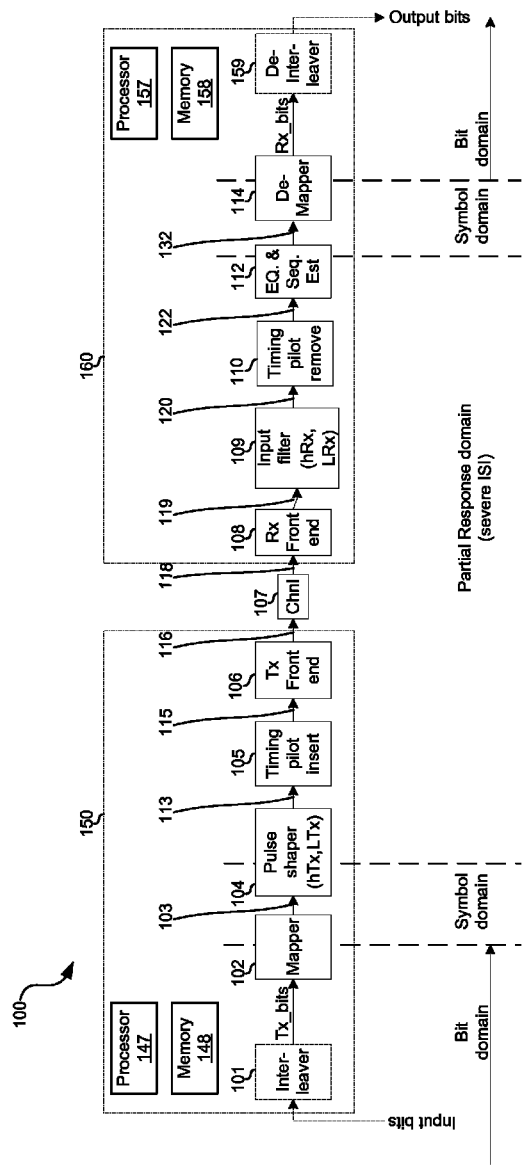
FIG. 1 is a block diagram depicting an example system configured for low-complexity, highly-spectrally-efficient communications, in accordance with an embodiment of the disclosure.

Certain embodiments of the disclosure may be found in a method and system for forward error correction encoding with parity check for use in low complexity highly-spectrally efficient communications. In various embodiments of the disclosure, a transmitter may be operable to insert parity samples into a stream of information symbols and transmit the resulting stream of information symbols and parity samples. The inserted parity samples may be utilized by a receiver to generate estimates of received information symbols that correspond to the information symbols, which were transmitted by the transmitter. A first pulse shaping filter characterized by a first response may be utilized to pulse shape the information symbols. A second pulse shaping filter characterized by a second response may be utilized to pulse shape the parity samples. The first response and the second response are diverse or uncorrelated. The transmitter may be operable to transmit a signal comprising the pulse shaped information symbols and the pulse shaped parity samples. A power of the parity samples may be optimized for best sequence estimation and for best symbol error rate (SER) performance.

The parity samples may be generated utilizing a parity function, which may comprise a linear or a non-linear function. For example, the parity function may utilize a non-linear function over a plurality of information symbols and the non-linear function may be diverse from a partial response signal convolution corresponding to the information symbols. The non-linear function and/or a linear function utilized for the parity check incorporates a modulo operation that ensures that an amplitude of corresponding values of parity samples are maintained in a particular range. The modulo operation may operate in a two dimensional (2D) domain. The parity function may be designed according to, for example, a desired SNR range at the receiver. The parity function may incorporate a memory depth, which may be larger than a memory of a partial response corresponding to taps of the first pulse shaping filter. The parity function may operate over adjacent and/or non-adjacent information symbols. The corresponding separation of the adjacent and/or non-adjacent information symbols may be uniformly and/or non-uniformly distributed. The corresponding intervals among the adjacent and/or non-adjacent information symbols are dependent on a length of an error event and/or an SNR operating range. The parity samples may be inserted between consecutive ones of the information symbols to generate a combined stream. The combined stream may be convolved with corresponding taps of the first pulse shaping filter.

A parity metric may be generated from the inserted parity samples and the generated parity metric may be utilized to select a best one or more of the generated estimates of the corresponding received information symbols. The parity samples may be mapped into symbols to become parity symbols. A slicing function may be utilized to slice or map the parity samples into parity symbols. The parity symbols may be related to N-QAM constellation where N is a positive multiplication of 2 that may be the same as that which may be utilized for the information symbols. Other constellations may be utilized as well.

FIG. 1 is a block diagram depicting an example system configured for low-complexity, highly-spectrally-efficient communications, in accordance with an embodiment of the disclosure. Referring to FIG. 1, there is shown a system 100. The system 100 comprises an a mapper circuit 102, a pulse shaping filter circuit 104, a timing pilot insertion circuit 105, a transmitter front-end circuit 106, a processor 147, memory 148, a channel 107, a receiver front-end 108, a filter circuit 109, a timing pilot removal circuit 110, an equalization and sequence estimation circuit 112, a de-mapping circuit 114, a processor 157 and memory 158. The components 102, 104, 105, 106, 147 and 148 may be part of a modulator or transmitter 150. In various exemplary embodiments of the disclosure, the modulator or transmitter 150 may comprise a base station or access point, a router, a gateway, a mobile device, a server, a computer, a computer peripheral device, a table, a modem, and/or a set-top box. The components 108, 109, 110, 112, 114, 157, and 158 may be part of a demodulator or receiver 160. In various exemplary embodiments of the disclosure, the demodulator or receiver 160 may comprise a base station or access point, a router, a gateway, a mobile device, a server, a computer, a computer peripheral device, a table, a modem, a and/or a set-top box. A device that comprises the modulator or transmitter 150 and the demodulator or receiver 160 may be referred to as a modem (modulator/demodulator) or a transceiver (transmitter/receiver). The modulator or transmitter 150 and the demodulator or receiver 160 may communicate via the communication medium or channel 107.

The processor 147 may comprise suitable logic, circuitry, interfaces and/or code that may be operable to control configuration, operation and maintenance of the modulator or transmitter 150 and its corresponding components, systems and/or subsystems. For example, the processor 147 may be operable to control configuration and operation of the interleaver circuit 101, the mapper circuit 102, the pulse shaping filter circuit 104, the timing pilot insertion circuit 105, the transmitter front-end circuit 106 and the memory 148.

The memory 148 may comprise suitable logic, circuitry, interfaces and/or code that may be operable to store information and/or data for the modulator or transmitter 150 and it corresponding components, systems and/or subsystems. The memory 148 may comprise volatile and/or non-volatile storage components or elements. The memory 148 may store code, configuration settings and/or operating data for the transmitter 150 and/or one or more of its components in the modulator or transmitter 150, for example, the interleaver circuit 101, the mapper circuit 102, the pulse shaping filter circuit 104, the timing pilot insertion circuit 105, and the transmitter front-end circuit 106, and the processor 147. The memory 148 may also comprise memory mapped I/O components such as registers for the components, systems and/or subsystems in the modulator or transmitter 150.

The processor 157 may comprise suitable logic, circuitry, interfaces and/or code that may be operable to control configuration, operation and maintenance of the demodulator or receiver 160 and its corresponding components, systems and/or subsystems. For example, the processor 157 may be operable to configure and control operation for the memory 158, the receiver front-end 108, the filter circuit 109, the timing pilot removal circuit 110, the equalization and sequence estimation circuit 112, the de-mapping circuit 114, and the de-interleaver 159.

The memory 158 may comprise suitable logic, circuitry, interfaces and/or code that may be operable to store information and/or data for the demodulator or receiver 160 and it corresponding components, systems and/or subsystems. The memory 158 may comprise volatile and/or non-volatile storage components or elements. The memory 158 may store code, configuration settings and/or operating data for the demodulator or receiver 160 and/or one or more of its components in the demodulator or receiver 160, for example, the memory 148, the receiver front-end 108, the filter circuit 109, the timing pilot removal circuit 110, the equalization and sequence estimation circuit 112, the de-mapping circuit 114, the de-interleaver 159, and the processor 157. The memory 158 may also comprise memory mapped I/O components such as registers for the components, systems and/or subsystems in the demodulator or receiver 160.

The interleaver 101 may comprise suitable logic, interfaces, circuitry and/or code that may be operable to interleave the coded bits or codewords and generate and output bitstream, namely Tx_bits. The coded bits or codewords may be generated by a forward error correction (FEC) circuit. In this regard, the interleaver is operable to scramble or spread the coded bits or codewords. This spreading of the codewords distributes the coded bits or codewords to, for example, mitigate the effect of burst errors. In some embodiments of the disclosure, the interleaver 101 may be an optional component. An exemplary interleaver may be operable to write the coded bits into a matrix column by column and reading them out row by row. Additional details of an exemplary interleaver may be found in the United States Application titled "Method and System for Forward Error Correction Decoding with Parity Check for Use in Low Complexity Highly-Spectrally Efficient Communications," which is incorporated herein by reference, as set forth above.

The mapper 102 may comprise suitable logic, interfaces, circuitry and/or code that may be operable to map bits of the Tx_bitstream to be transmitted to symbols according to a selected modulation scheme. The symbols may be output via signal 103. For example, for an quadrature amplitude modulation scheme having a symbol alphabet of N (N-QAM), the mapper may map each $\log_2(N)$ bits of the Tx_bitstream to single symbol represented as a complex number and/or as in-phase (I) and quadrature-phase (Q) components. Although N-QAM is used for illustration in this disclosure, aspects of this disclosure are applicable to any modulation scheme (e.g., amplitude shift keying (ASK), phase shift keying (PSK), frequency shift keying (FSK), etc.). Additionally, points of the N-QAM constellation may be regularly spaced ("on-grid") or irregularly spaced ("off-grid"). Furthermore, the symbol constellation used by the mapper may be optimized for best bit-error rate performance that is related to log-likelihood ratio (LLR) and to optimizing mean mutual information bit (MMIB). The Tx_bitstream may, for example, be the result of bits of data passing through a forward error correction (FEC) encoder and/or an interleaver. Additionally, or alternatively, the symbols out of the mapper 102 may pass through an interleaver.

The pulse shaper 104 may comprise suitable logic, interfaces, circuitry and/or code that may be operable to adjust the waveform of the signal 103 such that the waveform of the resulting signal 113 complies with the spectral requirements of the channel over which the signal 113 is to be transmitted. The spectral requirements may be referred to as the "spectral mask" and may be established by a regulatory body (e.g., the Federal Communications Commission in the United States or the European Telecommunications Standards Institute) and/or a standards body (e.g., Third Generation Partnership Project, Fourth Generation (4G)), that governs the communication channel(s) and/or standard(s) in use. The pulse shaper 104 may comprise, for example, an infinite impulse response (IIR) and/or a finite impulse response (FIR) filter. The number of taps, or "length," of the pulse shaper 104 is denoted herein as LTx, which is an integer. The impulse response of the pulse shaper 104 is denoted herein as hTx. The pulse shaper 104 may be configured such that its output signal 113 intentionally has a substantial amount of inter-symbol interference (ISI). Accordingly, the pulse shaper 104 may be referred to as a partial response pulse shaping filter, and the signal 113 may be referred to as a partial response signal or as residing in the partial response domain, whereas the signal 103 may be referred to as residing in the symbol domain. The number of taps and/or the values of the tap coefficients of the pulse shaper 104 may be designed such that the pulse shaper 104 is intentionally non-optimal for additive white Gaussian noise (AWGN) in order to improve tolerance of non-linearity in the signal path. In this regard, the pulse shaper 104 may offer superior performance in the presence of non-linearity as compared to, for example, a conventional near zero positive ISI pulse shaping filter (e.g., root raised cosine (RRC) pulse shaping filter). The pulse shaper 104 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

It should be noted that a partial response signal (or signals in the "partial response domain") is just one example of a type of signal for which there is correlation among symbols of the signal (referred to herein as "inter-symbol-correlated (ISC) signals"). Such ISC signals are in contrast to zero (or near-zero) ISI signals generated by, for example, raised-cosine (RC) or root-raised-cosine (RRC) filtering. For simplicity of illustration, this disclosure focuses on partial response signals generated via partial response filtering. Nevertheless, aspects of this disclosure are applicable to other ISC signals such as, for example, signals generated via decimation below the Nyquist frequency such that aliasing creates correlation between symbols.

The timing pilot insertion circuit 105 may comprise suitable logic, interfaces, circuitry and/or code that may be operable to insert a pilot signal which may be utilized by the receiver 160 for timing synchronization. The output signal 115 of the timing pilot insertion circuit 105 may thus comprise the signal 113 plus an inserted pilot signal (e.g., a sine wave at ¼×fbaud, where fbaud is the symbol rate). An example implementation of the pilot insertion circuit 105 is described in the United States patent application titled "Timing Synchronization for Reception of Highly-Spectrally-Efficient Communications," which is incorporated herein by reference, as set forth above.

The transmitter front-end 106 may comprise suitable logic, interfaces, circuitry and/or code that may be operable to amplify and/or upconvert the signal 115 to generate the signal 116. Thus, the transmitter front-end 106 may comprise, for example, a power amplifier and/or a mixer. The front-end may introduce non-linear distortion, phase noise and/or other non-idealities, to the signal 116. The non-linearity of the circuit 106 may be represented as FnlTx which may be, for example, a polynomial, or an exponential (e.g., Rapp model). The non-linearity may incorporate memory (e.g., Voltera series).

The communication medium or channel 107 may comprise a wired, wireless, and/or optical communication medium. The signal 116 may propagate through the channel 107 and arrive at the receive front-end 108 as signal 118. Signal 118 may be noisier than signal 116 (e.g., as a result of thermal noise in the channel) and may have higher or different ISI than signal 116 (e.g., as a result of multi-path).

The receiver front-end 108 may comprise suitable logic, interfaces, circuitry and/or code that may be operable to amplify and/or downconvert the signal 118 to generate the signal 119. Thus, the receiver front-end may comprise, for example, a low-noise amplifier and/or a mixer. The receiver front-end may introduce non-linear distortion and/or phase noise to the signal 119. The non-linearity of the circuit 108 may be represented as FnlRx, which may be, for example, a polynomial, or an exponential (e.g., Rapp model). The non-linearity may incorporate memory (e.g., Voltera series).

The timing pilot recovery and removal circuit 110 may comprise suitable logic, interfaces, circuitry and/or code that may be operable to lock to the timing pilot signal inserted by the pilot insertion circuit 105 in order to recover the symbol timing of the received signal. The output 122 may thus comprise the signal 120 minus (i.e., without) the timing pilot signal. An example implementation of the timing pilot recovery and removal circuit 110 is described in the United States patent application titled "Timing Synchronization for Reception of Highly-Spectrally-Efficient Communications," which is incorporated herein by reference, as set forth above.

The input filter 109 may comprise suitable logic, interfaces, circuitry and/or code that may be operable to adjust the waveform of the partial response signal 119 to generate partial response signal 120. The input filter 109 may comprise, for example, an infinite impulse response (IIR) and/or a finite impulse response (FIR) filter. The number of taps, or "length," of the input filter 109 is denoted herein as LRx, an integer. The impulse response of the input filter 109 is denoted herein as hRx. The number of taps, and/or tap coefficients of the pulse shaper 109 may be configured based on: a non-linearity model, Fnl, signal-to-noise ratio (SNR) of signal 120, the number of taps and/or tap coefficients of the Tx partial response filter 104, and/or other parameters. The number of taps and/or the values of the tap coefficients of the input filter 109 may be configured such that noise rejection is intentionally compromised (relative to a perfect match filter) in order to improve performance in the presence of non-linearity. As a result, the input filter 109 may offer superior performance in the presence of non-linearity as compared to, for example, a conventional near zero positive ISI matching filter (e.g., root raised cosine (RRC) matched filter). The input filter 109 may be designed as described in one or more of: the United States patent application titled "Design and Optimization of Partial Response Pulse Shape Filter," the United States patent application titled "Constellation Map Optimization For Highly Spectrally Efficient Communications," and the United States patent application titled "Dynamic Filter Adjustment For Highly-Spectrally-Efficient Communications," each of which is incorporated herein by reference, as set forth above.

As utilized herein, the "total partial response (h)" may be equal to the convolution of hTx and hRx, and, thus, the "total partial response length (L)" may be equal to LTx+LRx−1. L may, however, be chosen to be less than LTx+LRx−1 where, for example, one or more taps of the Tx pulse shaper 104 and/or the Rx input filter 109 are below a determined level. Reducing L may reduce decoding complexity of the sequence estimation. This tradeoff may be optimized during the design of the system 100.

The equalizer and sequence estimator 112 may comprise suitable logic, interfaces, circuitry and/or code that may be operable to perform an equalization process and a sequence estimation process. Details of an example implementation of the equalizer and sequence estimator 112 are described below with respect to FIG. 2. The output signal 132 of the equalizer and sequence estimator 112 may be in the symbol domain and may carry estimated values of corresponding transmitted symbols (and/or estimated values of the corresponding transmitted information bits of the Tx_bitstream) of signal 103. Although not depicted, the signal 132 may pass through an interleaver en route to the de-mapper 114. The estimated values may comprise soft-decision estimates, hard decision estimates, or both.

The de-mapper 114 may comprise suitable logic, interfaces, circuitry and/or code that may be operable to map symbols to bit sequences according to a selected modulation scheme. For example, for an N-QAM modulation scheme, the mapper may map each symbol to $\log_2(N)$ bits of the Rx_bitstream. The Rx_bitstream may, for example, be output to a de-interleaver and/or an FEC decoder. Alternatively, or additionally, the de-mapper 114 may generate a soft output for each bit, referred as LLR (Log-Likelihood Ratio). The soft output bits may be used by a soft-decoding forward error corrector (e.g. a low-density parity check (LDPC) decoder). The soft output bits may be generated using, for example, a Soft Output Viterbi Algorithm (SOVA) or similar. Such algorithms may use additional information of the sequence decoding process including metrics levels of dropped paths and/or estimated bit probabilities for generating the LLR, where $$LLR(b) = \log\left(\frac{P_b}{1-P_b}\right),$$

$P_b$ is the probability that bit b=1. Additional details of an exemplary FEC decoder and/or a de-interleaver may be found in the United States Application titled "Method and System for Forward Error Correction Decoding with Parity Check for Use in Low Complexity Highly-Spectrally Efficient Communications," which is incorporated herein by reference, as set forth above.

The de-interleaver 159 may comprise suitable logic, interfaces, circuitry and/or code that may be operable to de-interleave or despread the demapped bits using the reverse spreading algorithm that was utilized by the interleaver 101. In some embodiments of the disclosure, the de-interleaver 159 may be optional. In instances where the interleaver 101 is not present and no interleaving is done in the modulator or transmitter 150, then the de-interleaver 159 is not utilized. Additional details of an exemplary de-interleaver may be found in the United States Application titled "Method and System for Forward Error Correction Decoding with Parity Check for Use in Low Complexity Highly-Spectrally Efficient Communications," which is incorporated herein by reference, as set forth above.

In an example implementation, components of the system upstream of the pulse shaper 104 in the transmitter 150 and downstream of the equalizer and sequence estimator 112 in the receiver 160 may be as found in a conventional N-QAM system. Thus, through modification of the transmit side physical layer and the receive side physical layer, aspects of the disclosure may be implemented in an otherwise conventional N-QAM system in order to improve performance of the system in the presence of non-linearity as compared, for example, to use of RRC filters and an N-QAM slicer.

Figure 2:
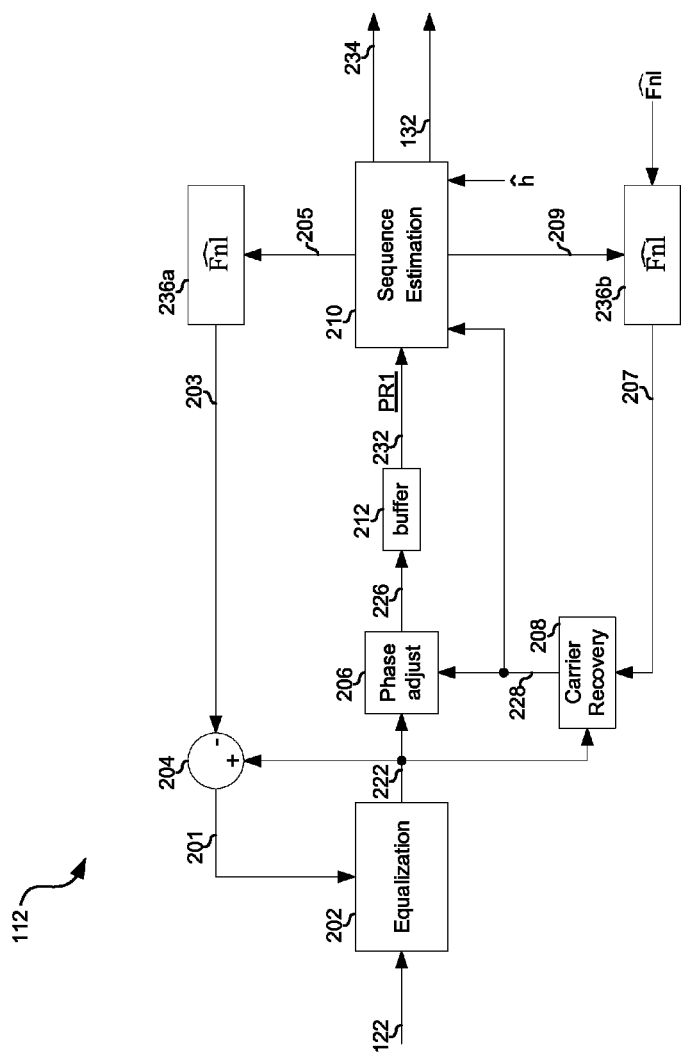
FIG. 2 is a block diagram depicting an example equalization and sequence estimation circuit for use in a system configured for low-complexity, highly-spectrally-efficient communications, in accordance with an embodiment of the disclosure.

FIG. 2 is a block diagram depicting an example equalization and sequence estimation circuit for use in a system configured for low-complexity, highly-spectrally-efficient communications, in accordance with an embodiment of the disclosure. Referring to FIG. 2, there is shown an equalizer circuit 202, a signal combiner circuit 204, a phase adjust circuit 206, a sequence estimation circuit 210, and non-linearity modeling circuits 236a and 236b.

The equalizer 202 may comprise suitable logic, interfaces, circuitry and/or code that may be operable to process the signal 122 to reduce ISI caused by the channel 107. The output 222 of the equalizer 202 is a partial response domain signal. The ISI of the signal 222 is primarily the result of the pulse shaper 104 and the input filter 109 (there may be some residual ISI from multipath, for example, due to use of the least means square (LMS) approach in the equalizer 202). The error signal, 201, fed back to the equalizer 202 is also in the partial response domain. The signal 201 is the difference, calculated by combiner 204, between 222 and a partial response signal 203 that is output by non-linearity modeling circuit 236a. An example implementation of the equalizer is described in the United States patent application titled "Feed Forward Equalization for Highly-Spectrally-Efficient Communications," which is incorporated herein by reference, as set forth above.

The carrier recovery circuit 208 may comprise suitable logic, interfaces, circuitry and/or code that may be operable to generate a signal 228 based on a phase difference between the signal 222 and a partial response signal 207 output by the non-linearity modeling circuit 236b. The carrier recovery circuit 208 may be as described in the United States patent application titled "Coarse Phase Estimation for Highly-Spectrally-Efficient Communications," which is incorporated herein by reference, as set forth above.

The phase adjust circuit 206 may comprise suitable logic, interfaces, circuitry and/or code that may be operable to adjust the phase of the signal 222 to generate the signal 226. The amount and direction of the phase adjustment may be determined by the signal 228 output by the carrier recovery circuit 208. The signal 226 is a partial response signal that approximates (up to an equalization error caused by finite length of the equalizer 202, a residual phase error not corrected by the phase adjust circuit 206, non-linearities, and/or other non-idealities) the total partial response signal resulting from corresponding symbols of signal 103 passing through pulse shaper 104 and input filter 109.

The buffer 212 may comprise suitable logic, interfaces, circuitry and/or code that buffers samples of the signal 226 and outputs a plurality of samples of the signal 226 via signal 232. The signal 232 is denoted PR1, where the underlining indicates that it is a vector (in this case each element of the vector corresponds to a sample of a partial response signal). In an example implementation, the length of the vector PR1 may be Q samples.

The input to the sequence estimation circuit 210 are the signal 232, the signal 228, and a response $\hat{h}$. The response $\hat{h}$ is based on h (the total partial response, discussed above). For example, the response $\hat{h}$ may represent a compromise between h (described above) and a filter response that compensates for channel non-idealities such as multi-path. The response $\hat{h}$ may be conveyed and/or stored in the form of LTx+LRx−1 tap coefficients resulting from convolution of the LTx tap coefficients of the pulse shaper 104 and the LRx tap coefficients of the input filter 109. Alternatively, the response $\hat{h}$ may be conveyed and/or stored in the form of fewer than LTx+LRx−1 tap coefficients—for example, where one or more taps of the LTx and LRx is ignored due to being below a determined threshold. The sequence estimation circuit 210 may be operable to output partial response feedback signals 205 and 209, a signal 234 that corresponds to the finely determined phase error of the signal 120, and signal 132 (which carries hard and/or soft estimates of transmitted symbols and/or transmitted bits). An example implementation of the sequence estimation circuit 210 is described below with reference to FIG. 3.

Figure 3:
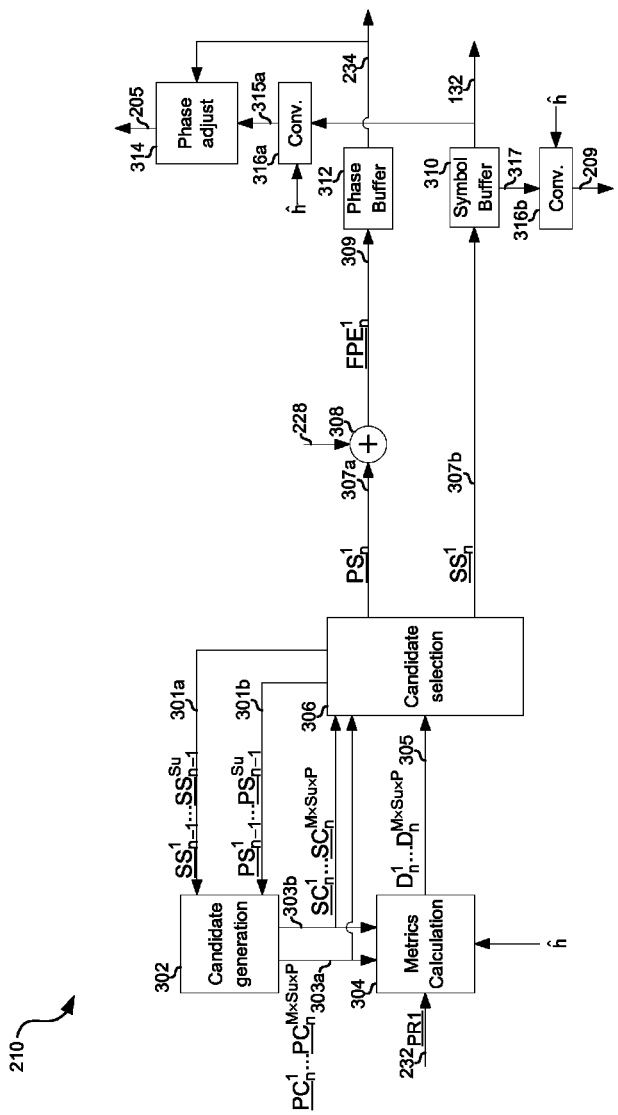
FIG. 3 is a block diagram depicting an example sequence estimation circuit for use in a system configured for low-complexity, highly-spectrally-efficient communications, in accordance with an embodiment of the disclosure.

The non-linear modeling circuit 236a may comprise suitable logic, interfaces, circuitry and/or code that may be operable to apply a non-linearity function Fnl (a model of the non-linearity seen by the received signal en route to the circuit 210) to the signal 205 resulting in the signal 203. Similarly, the non-linear modeling circuit 236b may apply the non-linearity function Fnl to the signal 209 resulting in the signal 207. Fnl may be, for example, a third-order or fifth-order polynomial. Increased accuracy resulting from the use of a higher-order polynomial for Fnl may tradeoff with increased complexity of implementing a higher-order polynomial. Where FnlTx is the dominant non-linearity of the communication system 100, Fnl modeling only FnlTx may be sufficient. Where degradation in receiver performance is above a threshold due to other non-linearities in the system (e.g., non-linearity of the receiver front-end 108) the model Fnl may take into account such other non-linearities FIG. 3 is a block diagram depicting an example sequence estimation circuit for use in a system configured for low-complexity, highly-spectrally-efficient communications, in accordance with an embodiment of the disclosure. Referring to FIG. 3, there is shown a candidate generation circuit 302, a metrics calculation circuit 304, a candidate selection circuit 306, a combiner circuit 308, a buffer circuit 310, a buffer circuit 312, a phase adjust circuit 314, and convolution circuits 316a and 316b. The sequence estimation process described with respect to FIG. 3 is an example only. Many variations of the sequence estimation process are also possible. For example, although the implementation described here uses one phase survivor per symbol survivor, another implementation may have PSu (e.g., PSu<Su) phase survivors that will be used commonly for each symbol survivor.

For each symbol candidate at time n, the metrics calculation circuit 304 may be operable to generate a metric vector $D_n^1 \ldots D_n^{M \times Su \times P}$ based on the partial response signal PR1, the signal 303a conveying the phase candidate vectors $PC_n^1 \ldots PC_n^{M \times Su \times P}$, and the signal 303b conveying the symbol candidate vectors $SC_n^1 \ldots SC_n^{M \times Su \times P}$, where underlining indicates a vector, subscript n indicates that it is the candidate vectors for time n, M is an integer equal to the size of the symbol alphabet (e.g., for N-QAM, M is equal to N), Su is an integer equal to the number of symbol survivor vectors retained for each iteration of the sequence estimation process, and P is an integer equal to the size of the phase alphabet. In an example implementation, the size of phase alphabet is three, with each of the three symbols corresponding to one of: a positive shift, a negative phase shift, or zero phase shift, as further described below with respect to FIGS. 5A-5D and in the United States patent application titled "Fine Phase Estimation for Highly Spectrally Efficient Communications," which is incorporated herein by reference, as set forth above. In an example implementation, each phase candidate vector may comprise Q phase values and each symbol candidate vector may comprise Q symbols. An example implementation of the metrics calculation block is described below with reference to FIG. 4.

The candidate selection circuit 306 may comprise suitable logic, interfaces, circuitry and/or code that may be operable to select Su of the symbol candidates $SC_n^1 \ldots SC_n^{M \times Su \times P}$ and Su of the phase candidates $PC_n^1 \ldots PC_n^{M \times Su \times P}$ based on the metrics $D_n^1 \ldots D_n^{M \times Su \times P}$. The selected phase candidates are referred to as the phase survivors $PS_n^1 \ldots PS_n^{Su}$. Each element of each phase survivors $PS_n^1 \ldots PS_n^{Su}$ may correspond to an estimate of residual phase error in the signal 232. That is, the phase error remaining in the signal after coarse phase error correction via the phase adjust circuit 206. The best phase survivor $PS_n^1$ is conveyed via signal 307a. The Su phase survivors are retained for the next iteration of the sequence estimation process (at which time they are conveyed via signal 301b). The selected symbol candidates are referred to as the symbol survivors $SS_n^1 \ldots SS_n^{Su}$. Each element of each symbol survivors $SS_n^1 \ldots SS_n^{su}$ may comprise a soft-decision estimate and/or a hard-decision estimate of a symbol of the signal 232. The best symbol survivor $SS_n^1$ is conveyed to symbol buffer 310 via the signal 307b. The Su symbol survivors are retained for the next iteration of the sequence estimation process (at which time they are conveyed via signal 301a). Although, the example implementation described selects the same number, Su, of phase survivors and symbol survivors, such is not necessarily the case. Operation of example candidate selection circuits 306 are described below with reference to FIGS. 5D and 6A-6B.

The candidate generation circuit 302 may comprise suitable logic, interfaces, circuitry and/or code that may be operable to generate phase candidates $PC_n^1 \ldots PC_n^{M \times Su \times P}$ and symbol candidates $SC_n^1 \ldots SC_n^{M \times Su \times P}$ from phase survivors $PS_n^1 \ldots PS_n^{Su}$ and symbol survivors $SS_{n-1}^1 \ldots SS_{n-1}^{su}$, wherein the index n−1 indicates that they are survivors from time n−1 are used for generating the candidates for time n. In an example implementation, generation of the phase and/or symbol candidates may be as, for example, described below with reference to FIGS. 5A and 5B and/or in the United States patent application titled "Joint Sequence Estimation of Symbol and Phase with High Tolerance of Nonlinearity," which is incorporated herein by reference, as set forth above.

The symbol buffer circuit 310 may comprise suitable logic, interfaces, circuitry and/or code, which may comprise a plurality of memory elements that may be operable to store one or more symbol survivor elements of one or more symbol survivor vectors. The phase buffer circuit 312 may also comprise a plurality of memory elements operable to store one or more phase survivor vectors. Example implementations of the buffers 310 and 312 are described below with reference to FIGS. 7B and 7C, respectively.

The combiner circuit 308 may comprise suitable logic, interfaces, circuitry and/or code that may be operable to combine the best phase survivor, $PS_n^1$, conveyed via signal 307a, with the signal 228 generated by the carrier recovery circuit 208 (FIG. 2) to generate fine phase error vector $FPE_n^1$, conveyed via signal 309, which corresponds to the finely estimated phase error of the signal 222 (FIG. 2). At each time n, fine phase error vector $FPE_{n-1}^1$ stored in phase buffer 312 may be overwritten by $FPE_n^1$.

The phase adjust circuit 314 may comprise suitable logic, interfaces, circuitry and/or code that may be operable to adjust the phase of the signal 315a by an amount determined by the signal 234 output by phase buffer 312, to generate the signal 205.

The circuit 316a may comprise suitable logic, interfaces, circuitry and/or code that, which may be operable to perform convolution, and may comprise a FIR filter or IIR filter, for example. The circuit 316a may be operable to convolve the signal 132 with the response ĥ, resulting in the partial response signal 315a. Similarly, the convolution circuit 316b may be operable to convolve the signal 317 with the response ĥ, resulting in the partial response signal 209. As noted above, the response ĥ may be stored by, and/or conveyed to, the sequence estimation circuit 210 in the form of one or more tap coefficients, which may be determined based on the tap coefficients of the pulse shaper 104 and/or input filter 109 and/or based on an adaptation algorithm of a decision feedback equalizer (DFE). The response h may thus represent a compromise between attempting to perfectly reconstruct the total partial response signal (103 as modified by pulse shaper 104 and input filter 109) on the one hand, and compensating for multipath and/or other non-idealities of the channel 107 on the other hand. In this regard, the system 100 may comprise one or more DFEs as described in one or more of: the United States patent application titled "Decision Feedback Equalizer for Highly-Spectrally-Efficient Communications," the United States patent application titled "Decision Feedback Equalizer with Multiple Cores for Highly-Spectrally-Efficient Communications," and the United States patent application titled "Decision Feedback Equalizer Utilizing Symbol Error Rate Biased Adaptation Function for Highly-Spectrally-Efficient Communications," each of which is incorporated herein by reference, as set forth above.

Thus, signal 203 is generated by taking a first estimate of transmitted symbols, (an element of symbol survivor $SS_n^1$), converting the first estimate of transmitted symbols to the partial response domain via circuit 316a, and then compensating for non-linearity in the communication system 100 via circuit 236a (FIG. 2). Similarly, signal 207 is generated from a second estimate of transmitted symbols (an element of symbol survivor $SS_n^1$) that is converted to the partial response domain by circuit 316b to generate signal 209, and then applying a non-linear model to the signal 209b to compensate for non-linearity in the signal path.

Figure 4:
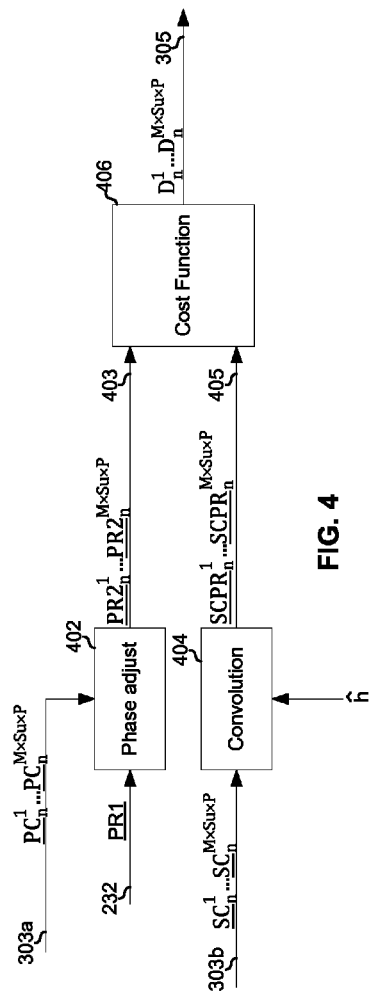
FIG. 4 is a block diagram depicting an example metric calculation circuit for use in a system configured for low-complexity, highly-spectrally-efficient communications, in accordance with an embodiment of the disclosure.

FIG. 4 is a block diagram depicting an example metric calculation circuit for use in a system configured for low-complexity, highly-spectrally-efficient communications, in accordance with an embodiment of the disclosure. Referring to FIG. 4, there is shown a phase adjust circuit 402, a convolution circuit 404, and a cost function calculation circuit 406.

The phase adjust circuit 402 may comprise suitable logic, interfaces, circuitry and/or code that may be operable to phase shift one or more elements of the vector PR1 (conveyed via signal 232) by a corresponding one or more values of the phase candidate vectors $PC_n^1 \ldots PC_n^i \ldots PC_n^{M \times Su \times P}$. The signal 403 output by the phase adjust circuit 402 thus conveys a plurality of partial response vectors $PR2_n^1 \ldots PR2_n^{M \times Su \times P}$, each of which comprises a plurality of phase-adjusted versions of PR1.

The circuit 404 may comprise suitable logic, interfaces, circuitry and/or code that may be operable to perform convolution, may comprise a FIR filter or IIR filter, for example. The circuit 404 may be operable to convolve the symbol candidate vectors $SC_n^1 \ldots SC_n^{M \times Su \times P}$ with $\hat{h}$. The signal 405 output by the circuit 404 thus conveys vectors $SCPR_n^1 \ldots SCPR_n^{M \times Su \times P}$, each of which is a candidate partial response vector.

The cost function circuit 406 may comprise suitable logic, interfaces, circuitry and/or code that may be operable to generate metrics indicating the similarity between one or more of the partial response vectors $PR2_n^1 \ldots PR_2^{M \times Su \times P}$ and one or more of the vectors $SCPR_n^1 \ldots SCPR_n^{M \times Su \times P}$ to generate error metrics $D_n^1 \ldots D_n^{M \times Su \times P}$. In an example implementation, the error metrics may be Euclidean distances calculated as shown below in equation 1.

$$D_n^i = |(\underline{SCPR_n^i}) - (\underline{PR2_n^i})|^2 \qquad \text{EQ. 1}$$

for $1 \leq i \leq M \times Su \times P$.

FIGS. 5A-5D depict portions of an example sequence estimation process performed by a system configured for low-complexity, highly-spectrally-efficient communications, in accordance with an embodiment of the disclosure. In FIGS. 5A-5D it is assumed, for purposes of illustration, that M=4 (a symbol alphabet of α, β, χ, α), Su=3 (three symbol survivors are selected each iteration), Psu=Su (three phase survivors are selected each iteration), P=3 (a phase alphabet of plus, minus, and zero), and that Q (vector length) is 4.

Figure 5A:
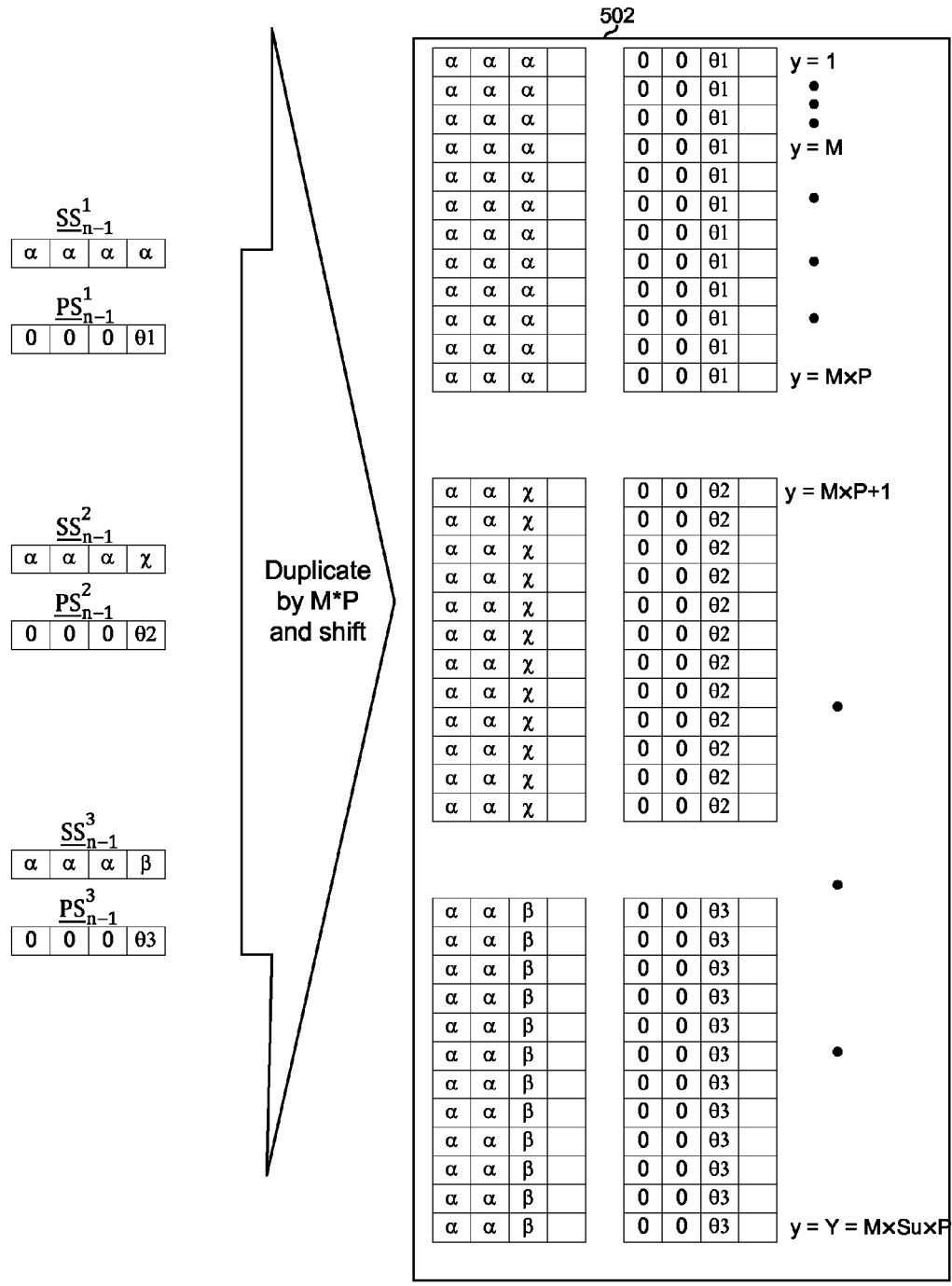
FIGS. 5A-5D depict portions of an example sequence estimation process performed by a system configured for low-complexity, highly-spectrally-efficient communications, in accordance with an embodiment of the disclosure.

Referring to FIG. 5A, there is shown phase and symbol survivors from time n−1 on the left side of the figure. The first step in generating symbol candidates and phase candidates from the survivors is to duplicate the survivors and shift the contents to free up an element in each of the resulting vectors called out as 502 on the right side of FIG. 5A. In the example implementation depicted, the survivors are duplicated M*P−1 times and shifted one element.

Figure 5B:
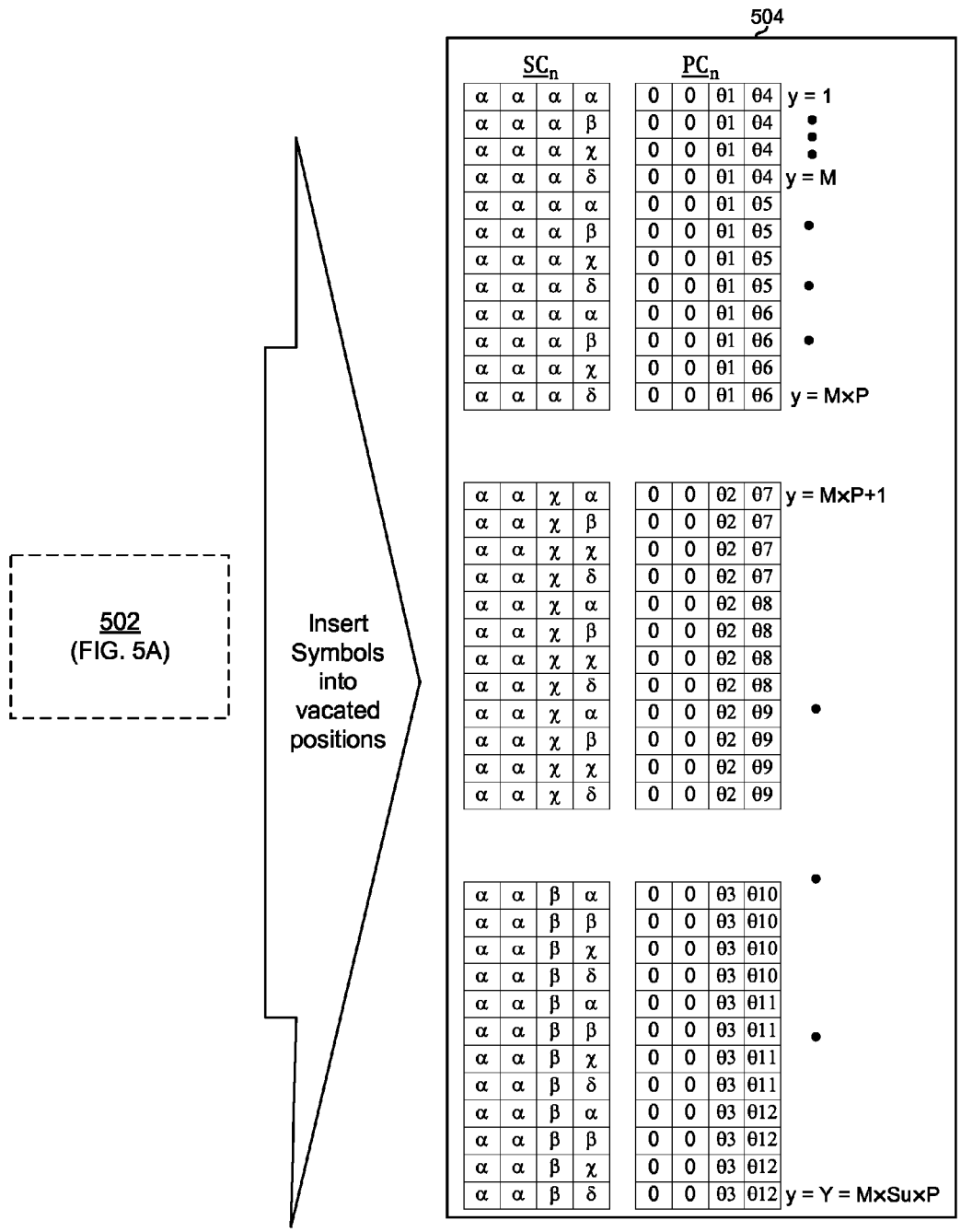

Referring to FIG. 5B, the next step in generating the candidates is inserting symbols in the vacant elements of the symbol vectors and phase values in the vacant elements of the phase vectors, resulting in the symbol candidates and phase candidate for time n (called out as 504 in FIG. 5B). In the example implementation depicted, each of the M possible symbol values is inserted into Su*P symbol candidates, and each of the P phase values may be inserted into M*Su candidates. In the example implementation depicted, θ5 is a reference phase value calculated based on phase survivor $PS_{n-1}^1$. For example, the reference phase θ5 may be the average (or a weighted average) of the last two or more elements of the phase survivor $PS_{n-1}^1$ (in the example shown, the average over the last two elements would be (θ5+0)/2). In the example implementation depicted, θ4=θ5−Δθ, and θ6=θ5+Δθ, where Δθ, is based on: the amount of phase noise in signal 226, slope (derivative) of the phase noise in signal 226, signal-to-noise ratio (SNR) of signal 226, and/or capacity of the channel 107. Similarly, in the example implementation shown, θ8 is a reference phase value calculated based on phase survivor $PS_{n-1}^2$, θ7=θ8−Δθ, θ9=θ8+Δθ, θ11 is a reference phase value calculated based on phase survivor $PS_{n-1}^3$, θ10=θ11−Δθ, and θ12=θ11+Δθ.

Figure 5C:
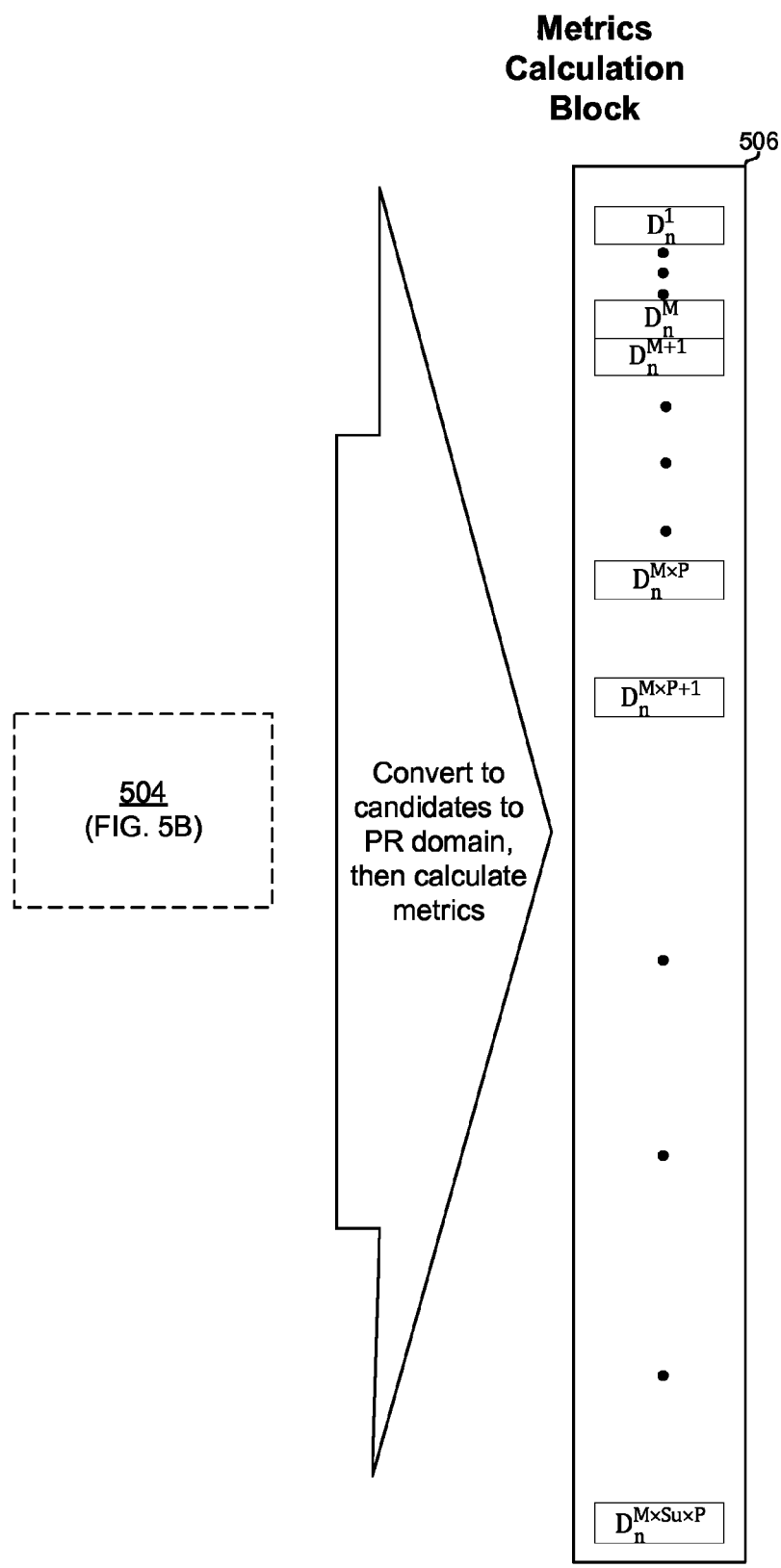

Referring to FIG. 5C, as described above with reference to FIG. 4, the symbol candidates are transformed to the partial response domain via a convolution, the reference signal PR1 is phase adjusted, and then the metrics $D_n^1 \ldots D_n^{M \times Su \times P}$ are calculated based on the partial response signals $PR2_n^1 \ldots PR2_n^{M \times Su \times p}$ and $SCPR_n^1 \ldots ScpR_n^{M \times Su \times P}$.

Figure 5D:
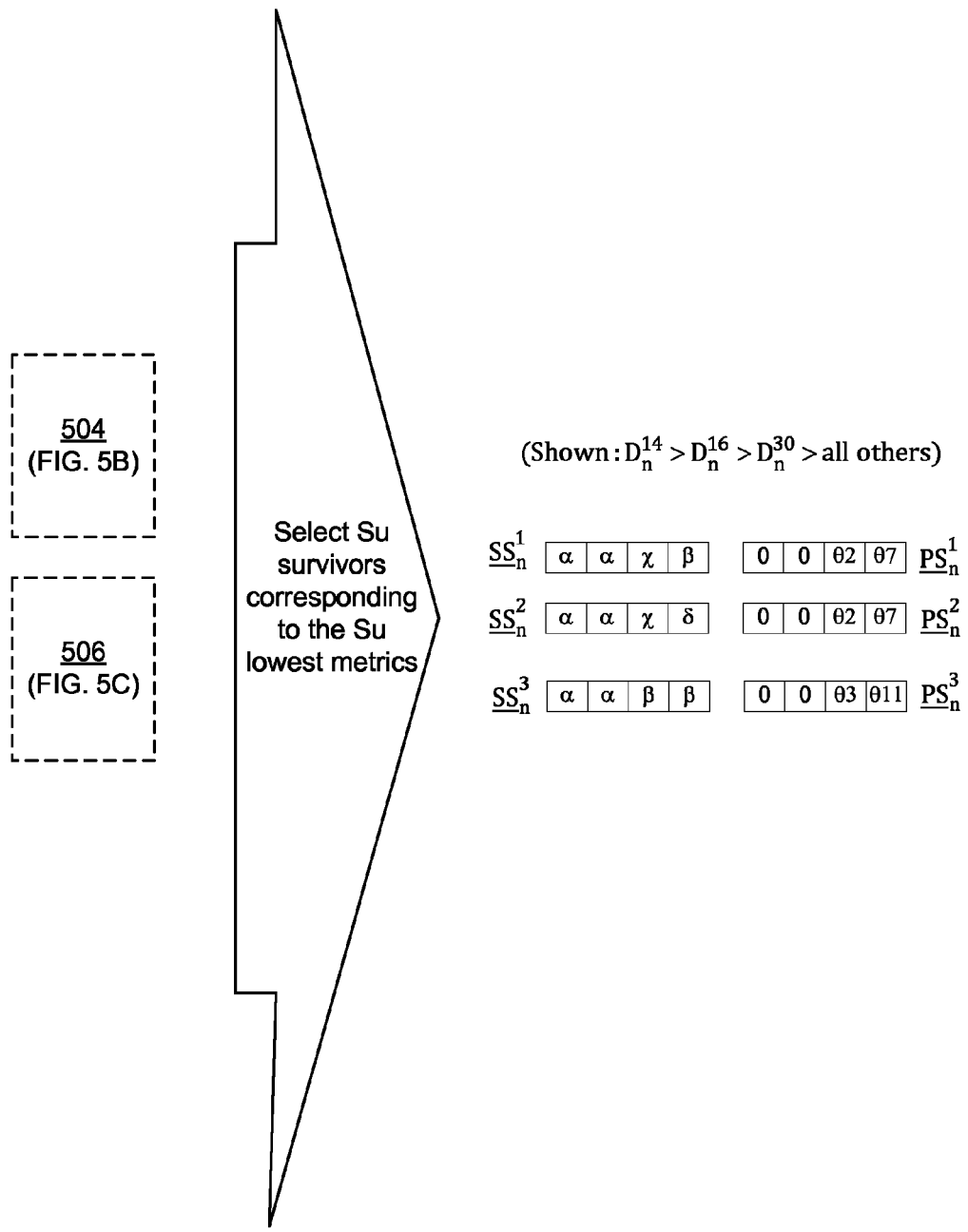

Referring to FIG. 5D, the metrics calculated in FIG. 5C are used to select which of the candidates generated in FIG. 5B are selected to be the survivors for the next iteration of the sequence estimation process. FIG. 5D depicts an example implementation in which the survivors are selected in a single step by simply selecting Su candidates corresponding to the Su best metrics. In the example implementation depicted, it is assumed that metric $D_n^{14}$ is the best metric, that $D_n^{16}$ is the second best metric, and that $D_n^{30}$ is the third-best metric. Accordingly, symbol candidate $SC_n^{14}$ is selected as the best symbol survivor, $PC_n^{14}$ is selected as the best phase survivor, symbol candidate $SC_n^{16}$ is selected as the second-best symbol survivor, $PC_n^{16}$ is selected as the second-best phase survivor, symbol candidate $SC_n^{30}$ is selected as the third-best symbol survivor, and $PC_n^{30}$ is selected as the third-best phase survivor. The survivor selection process of FIG. 5D may result in selecting identical symbol candidates, which may be undesirable. A survivor selection process that prevents redundant symbol survivors is described below with reference to FIGS. 6A and 6B.

Figure 6A:
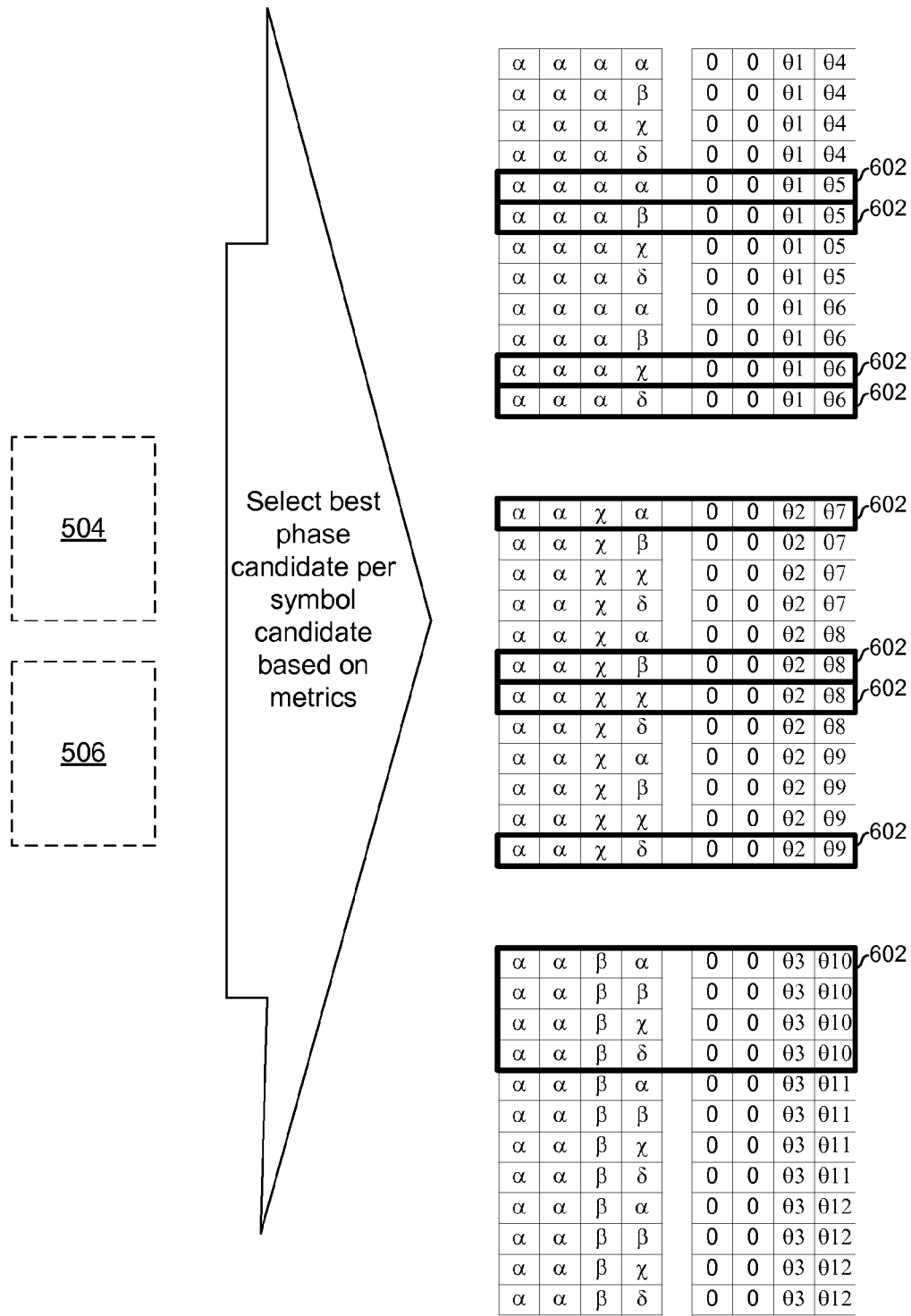
FIGS. 6A and 6B depict an example survivor selection process that is an alternative to the process depicted in FIG. 5D, in accordance with an embodiment of the disclosure.
Figure 6B:
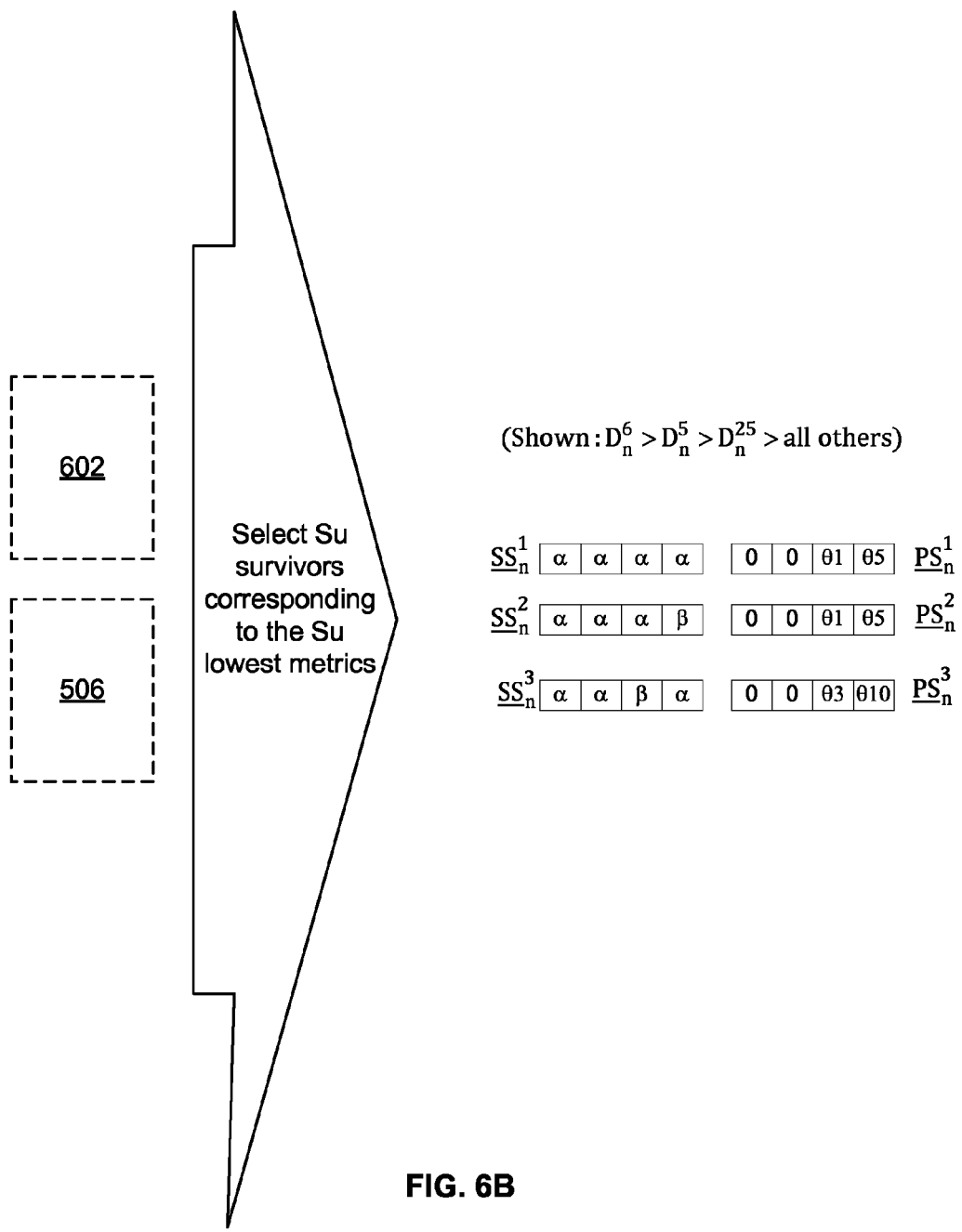

FIGS. 6A and 6B depict an example survivor selection process that is an alternative to the process depicted in FIG. 5D, in accordance with an embodiment of the disclosure. In FIG. 6A, the candidates generated in FIG. 5B and the metrics calculated in FIG. 5C are used to select the best phase candidate for each symbol candidate (selected candidates are called out by reference designator 602). In FIG. 6B, the best Su of the candidates selected in FIG. 6A are selected as the survivors for the next iteration of the sequence estimation process. In the example implementation depicted, it is assumed that metric $D_n^6$ is the best metric, that $D_n^5$ is the second-best metric, and that $D_n^{25}$ is the third-best metric. Accordingly, symbol candidate $SC_n^6$ is selected as the best symbol survivor, $PC_n^6$ is selected as the best phase survivor, symbol candidate $SC_n^5$ is selected as the second-best symbol survivor, $PC_n^{25}$ is selected as the second-best phase survivor, symbol candidate $SC^2{}_n^5$ is selected as the third-best symbol survivor, and $PC_n^{25}$ is selected as the third-best phase survivor.

Although the implementations described with reference to FIGS. 5A-6B use one phase survivor per symbol survivor, the disclosure is not limited in this regard. Accordingly, other example implementations may use PSu (e.g., PSu<Su) phase survivors that are used commonly for each symbol survivor. In one or more of such implementations, each of the phase survivors $PS_{n-1}^1 \ldots PS_{n-1}^{PSu}$ may be duplicated P times to generate phase successors, and then duplicated M*Su times to be associated with corresponding symbols successors. The number of symbol candidates in such implementations may be M*Su*PSu*P.

Figure 7A:
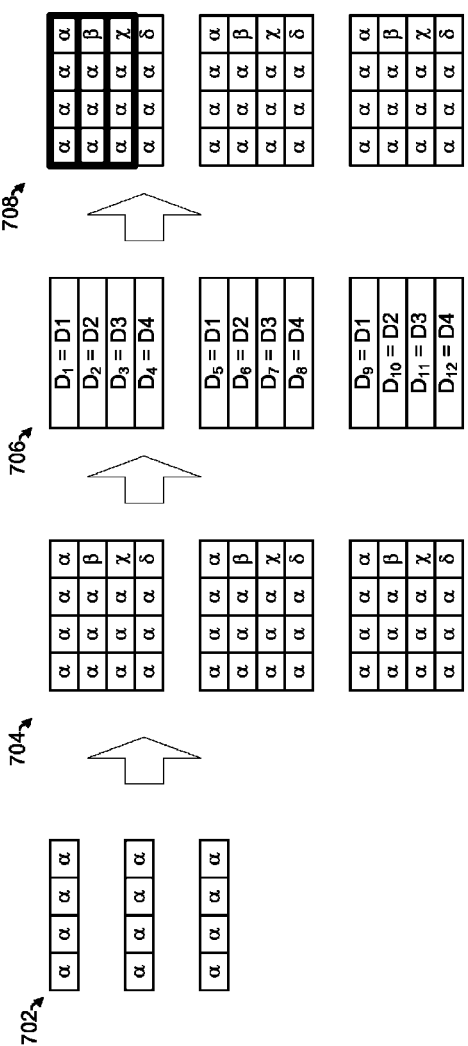
FIG. 7A is a diagram illustrating initialization of the sequence estimation process, in accordance with an embodiment of the disclosure.

FIG. 7A is a diagram illustrating initialization of the sequence estimation process, in accordance with an embodiment of the disclosure. In FIG. 7A it is again assumed, for illustration, that M=4 (a symbol alphabet of α, β, χ, δ), Su=3 (three symbol survivors are selected each iteration), Psu=Su (three phase survivors are selected each iteration), P=3 (a phase alphabet of plus, minus, and zero), and that Q (vector length) is 4. On the far left of FIG. 7A is shown symbol survivors 702 after receipt of a preamble sequence. Because the preamble is a deterministic sequence, all symbol survivors are forced to the same values. From the survivors 702 are generated the candidates 704 and metrics 706 are calculated based on the candidates 704. In the example implementation shown, since the survivors were all the same, there are only four unique symbol candidates. The metrics for the four candidates are, respectively, D1, D2, D3, and D4. Accordingly, if the three candidates corresponding to the best three metrics were chosen, then the three candidates corresponding to D1 would all be chosen and the survivors for the next iteration would again all be identical. Accordingly, the three best, non-redundant symbol candidates are selected (as indicated by the heavy lines). Consequently, one of the candidates having the metric value D1 is selected, one of the candidates having the metric value D2 is selected, and one of the candidates having metric value D3 is selected, such that three non-redundant survivors are used for the next iteration.

Figure 7B:
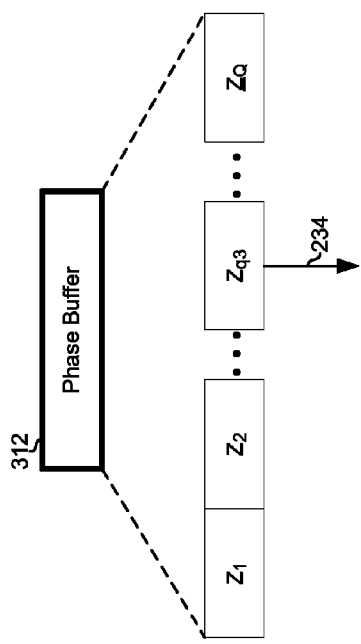
FIG. 7B depicts an example implementation of the phase buffer shown in FIG. 3, in accordance with an embodiment of the disclosure.

FIG. 7B depicts an example implementation of the phase buffer shown in FIG. 3, in accordance with an embodiment of the disclosure. In the example implementation depicted, the depth of the phase buffer 312 is Q and the phase value stored at element q is represented as $Z_q$, for q from 1 to Q. In the example implementation depicted, the value stored in element q3 is output as the signal 234. For each iteration of the sequence estimation process, Q elements of the phase buffer 312 storing Q values of $PS_{n-1}^{1}$ may be overwritten with Q values of $PS_n^{1}$.

Figure 7C:
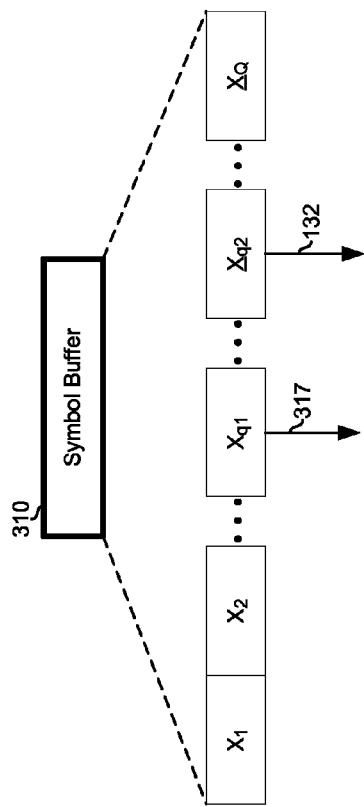
FIG. 7C depicts an example implementation of the symbol buffer shown in FIG. 3, in accordance with an embodiment of the disclosure.

FIG. 7C depicts an example implementation of the symbol buffer shown in FIG. 3, in accordance with an embodiment of the disclosure. In the example implementation depicted, the value(s) stored in one or more elements starting with index q1 (e.g., values stored in elements q1 through q1+L−1) is/are output as the signal 317 and the value(s) stored in one or more elements starting with index q2 (e.g., values stored in elements q2 through q2+L−1) is/are output as the signal 132. Because the value(s) output as the signal 317 start from a lower-indexed element of the symbol buffer, the delay between receiving a signal sample and outputting the corresponding value of signal 317 is shorter than the delay between receiving a signal sample and outputting the corresponding value of the signal 132. Because the value(s) output as the signal 132 start from a higher-indexed element, however, it/they is/are likely to be less error-prone. These concepts are further illustrated with reference to in FIGS. 8C and 8D. In an example implementation, q2 is equal to q3.

Figure 7D:
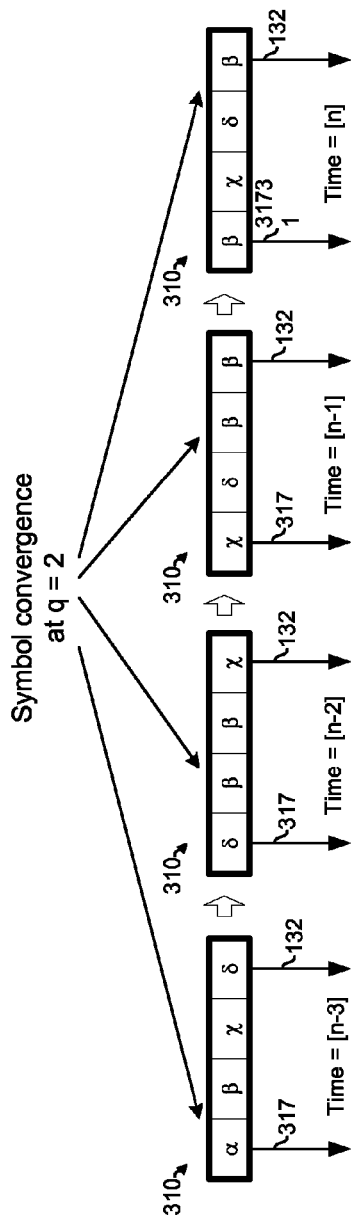
FIG. 7D depicts contents of an example symbol buffer over a plurality of iterations of a sequence estimation process, in accordance with an embodiment of the disclosure.

FIG. 7D depicts contents of an example symbol buffer over a plurality of iterations of a sequence estimation process, in accordance with an embodiment of the disclosure. In the example implementation shown in FIG. 7D, the symbol buffer 310 comprises four elements with the signal 317 corresponding to the contents of the first element (for simplicity of illustration, in FIGS. 7D and 7E, it is assumed only one element is output as signal 317 on each iteration) and the signal 132 corresponding to the fourth element (for simplicity of illustration, in FIGS. 7D and 7E, it is assumed only one element is output as signal 132 on each iteration). In the example implementation depicted, during each iteration of the sequence estimation process, candidates are generated by duplicating the survivors from the previous iteration, shifting the values by one element, and the appending a new value into the vacated element. Accordingly, ideally each survivor would differ from the previous survivor only in the lowest-indexed element (corresponding to the most-recent symbol). Where other elements of the most-recent survivor differ from corresponding elements of the previous survivor, such difference indicates that there is an error in those elements (either in the most-recent survivor or in the previous survivor). Given the convolutional nature of the partial response signal, symbols at higher indexes in the buffer are more reliable. Thus the symbol values will tend to converge as they move toward the right in FIG. 7D.

Figure 7E:
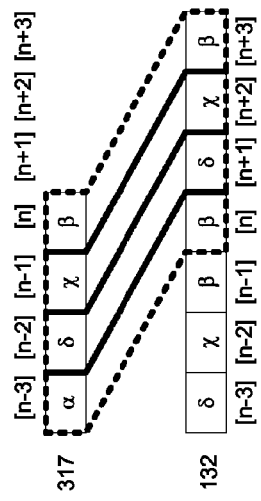
FIG. 7E depicts generated signals corresponding to the symbol buffer contents shown in FIG. 7D, in accordance with an embodiment of the disclosure.

FIG. 7D shows the contents of example symbol buffer 310 at times n−3, n−2, n−1, and n. At time n−3, a symbol survivor having values α, β, χ, δ is stored in the symbol buffer 310. FIG. 7E depicts generated signals corresponding to the symbol buffer contents shown in FIG. 7D, in accordance with an embodiment of the disclosure. In FIG. 7E, the values of the signals are shown for times n−3 to time n+3. The dashed lines in FIG. 7E illustrate the delay between the signal 317 and the signal 132.

Accordingly, as shown in FIG. 7E, the value of signal 317 at time n−3 is 'α' and the value of signal 132 is 'δ.' At time n−2, a new symbol survivor having values δ, β, β, χ is stored in the symbol buffer 310. Accordingly, as shown in FIG. 7E, the value of signal 317 at time n−2 is 'δ' and the value of signal 132 is 'χ.' At time n−1, a new symbol survivor having values χ, δ, β, β is stored in the symbol buffer 310. Accordingly, as shown in FIG. 7E, the value of signal 317 at time n−1 is 'χ' and the value of signal 132 is 'β.' At time n, a new symbol survivor having values β, χ, δ, β is stored in the symbol buffer 310. Accordingly, as shown in FIG. 7E, the value of signal 317 at time n is β and the value of signal 132 is 'β.' Thus, in the example scenario depicted in FIG. 7D, the value in the first element of the symbol buffer 310 at time n−3 was erroneous and the symbol did not converge until it reached the second element (q=2) of the buffer 310. That is, at time n−2 the symbol changed from α to β and then remained β at times n−1 and n. This illustrates the consequence of taking signal 317 from the first element of the symbol buffer 310 and taking the signal 132 from the fourth element of the symbol buffer 312. Namely, the signal 317 has less delay than the signal 132 but is also more error prone than the signal 132.

Figure 8A:
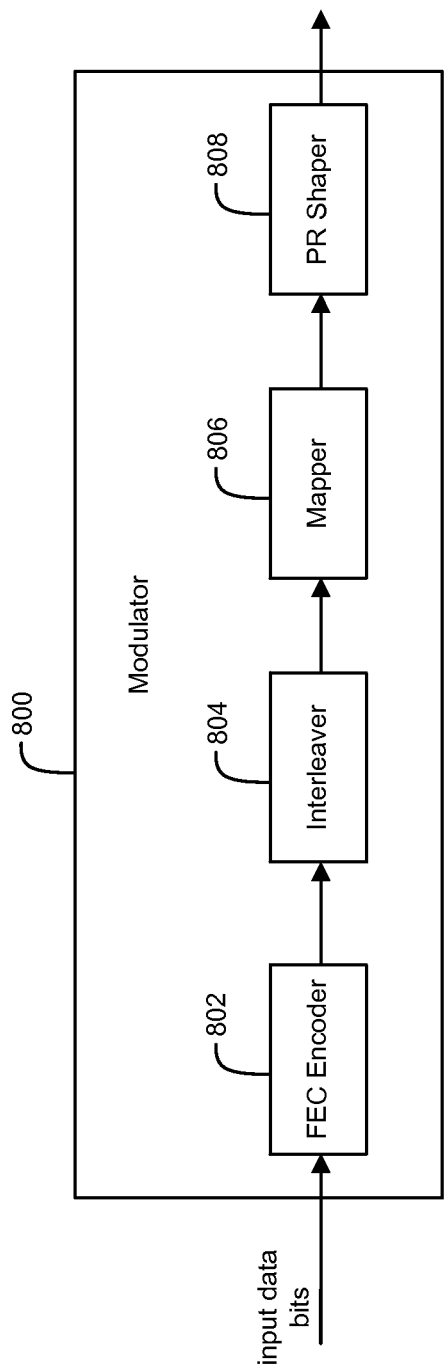
FIG. 8A is a block diagram illustrating an exemplary portion of a data path for a modulator that is operable to provide parity check in the symbol domain for use in low complexity highly-spectrally efficient communication, in accordance with an embodiment of the disclosure.

FIG. 8A is a block diagram illustrating an exemplary portion of a data path for a modulator that is operable to provide parity check in the symbol domain for use in low complexity highly-spectrally efficient communication, in accordance with an embodiment of the disclosure. Referring to FIG. 8A, there is shown a modulator or transmitter 800. The modulator or transmitter 800 may comprise a FEC encoder 802, an interleaver 804, a mapper 806, and a partial response (PR) shaper 808. It should be recognized that the modulator or transmitter 800 may comprise other modules, functionality and/or components, which are not illustrated in FIG. 8A. These may comprise, for example, clock generation, up/down sampling, management, control and monitoring and/or adaptive subsystems. FIGS. 1-7E provides some additional details of the exemplary modulator or transmitter 800, which is illustrated in FIG. 8A. In this regard, for example, the modulator or transmitter 150 of FIG. 1 provides more details of one example of the modulator or transmitter 800 of FIG. 8A.

The FEC encoder 802 comprises suitable logic, circuitry, interfaces, and/or code that may be operable to encode the input data bits so as to provide forward error correction. In this regard, the FEC encoder 802 is operable to encode the input data bits in order to generate codewords that may be utilized on the receive side to correct errors that may occur during transmission. In an exemplary embodiment of the disclosure, the FEC encoder 802 may be operable to utilize Reed-Solomon encoding, low density parity check (LDPC) encoding, or other FEC encoding schemes.

The interleaver 804 comprises suitable logic, circuitry, interfaces, and/or code that may be operable to interleave the coded bits or codewords. In this regard, the interleaver is operable to scramble or spread the coded bits or codewords. This spreading of the codewords distributes the coded bits or codewords to mitigate the effect of burst errors. In some embodiments of the disclosure, the interleaver 804 may be optional in instances where long size FEC coding is utilized.

The mapper 806 comprises suitable logic, circuitry, interfaces, and/or code that may be operable to map the resulting interleaved coded bits or codewords into symbols. In this regard, the mapper 806 may be operable to receive, from the interleaver 804, the interleaved coded bits or codewords and generate symbols based on the modulation scheme being utilized, for example, quadrature amplitude modulation (QAM). The mapper 806 may be substantially similar to the mapper 102, an example of which is illustrated in FIG. 1.

The PR shaper 808 comprises suitable logic, circuitry, interfaces, and/or code that may be operable to spectrally shape the signal. The PR shaper may also be referred to as a PR filter or PR pulse shaping filter. Notwithstanding, the PR shaper 808 may be operable to filter or shape the signal comprising the generated symbols, in order to provide the desired spectral shape of the signal to be transmitted, while concurrently incorporating severe inter-symbol interference (ISI). The PR shaper 808 may comprise a low pass filter whose filter taps or coefficients are convolved with the information symbols to provide the desired spectral shape and ISI requirements. The PR shaper 808 may be operable to provide up-sampling to support the needed analog bandwidth to drive a corresponding media-matching device. The PR shaper 808 may be substantially similar to the pulse shaper 104, an example of which is illustrated in FIG. 1.

In accordance with an embodiment of the disclosure, the PR shaper 808 may also be operable to utilize a parity function to generate parity values, which are added to the generated output symbol stream. In this regard, the PR shaper 808 may be operable to generate the parity in the sample domain. The generated parity check values may be utilized by the equalizer and sequence estimation (SE) module 856 in the demodulator 850 to determine or estimate the transmitted sequences or symbols based on the received symbols. In this regard, the parity check values that are added to the generated output symbol stream may be utilized to provide improved sequence estimation detection.

The PR shaper 808 may also comprise a high pass filter (or other filter response that is sufficiently different than the PR pulse shaping filter and/or the total partial response (h)) whose tap coefficients, which are representative of a parity function, are convolved with the information symbols to generate the parity values. The parity function that is utilized by the PR shaper 808 to generate the parity values may comprise a linear or non-linear function, which provides diverse a-priori knowledge on the information symbols. The parity function that is utilized is designed so that it provides diverse information on the information symbols. The generated parity values may comprise an integer or fractional number of symbols and it may be periodic, aperiodic, or comply with any pattern.

In operation, the FEC encoder 802 may be operable to encode the input data bits to generate codewords. The generated codewords may be communicated to the interleaver 804. The interleaver 804 may be operable to spread the codewords to mitigate the effect of burst errors. The resulting interleaved codewords may be communicated to the mapper 806. The mapper 806 is operable to map the interleaved codewords into symbols in accordance with a corresponding modulation scheme. The corresponding symbols are communicated to the PR shaper 808, which performs filtering and pulse shaping of the resulting signal to conform to the desired spectral shape.

The PR shaper 808 is also operable to concurrently filter the signal in order to incorporate severe inter-symbol interference during filtering and pulse shaping. In accordance with an embodiment of the disclosure, the PR shaper 808 may be operable to generate parity values for the corresponding symbols and insert or embed the generated parity values in the resulting symbol stream.

The parity may possess diverse information on the symbols. In other words, the parity function may be uncorrelated with the partial response (PR) function. For example, while the partial response signal, which may be derived utilizing a low pass filter convolved with the information symbols, the parity check may be derived utilizing a filter having a response that is sufficiently different from the PR pulse shaping filter and/or the total partial response (h) (e.g., if h is a low-pass response, the filter used for generating parity symbols may be a high-pass filter). The taps of the partial response shaper 808 may be convolved with a plurality of information symbols to provide the parity value that will be inserted or embedded in the symbols stream. Additionally, a non-linear function may be used over a plurality of symbols. The non-linear function may be diverse from the partial response signal convolution and is appropriately designed to have a threshold value according to the desired threshold SNR at the receiver, that is, for non-linear detection associated with threshold behavior as a function of SNR.

The parity check function, which may also be referred to as a parity function, may incorporate a memory depth, which may be larger than a memory of the partial response (which may be limited to the length of the partial response filter taps). A typical error event lasts less than the memory depth of the partial response filter. A parity function that utilizes symbols that exceed the last of an error event, increases the probability of selecting the error free path and improve sequence estimation decoding performance. However, if the memory depth utilized by the parity function is too large so that all survivor paths are converged and hold the same estimated symbols, then the parity check may have less impact and will not improve path selection as survivor paths may already be selected wrong path. Thus there is an optimum memory depth for the parity check function.

The parity function may operate over adjacent or non-adjacent information symbols. The intervals among the information symbols that are participating in the parity check is dependent on the length of the error event and an SNR operating range. Additionally, the separation may be uniformly or non-uniformly distributed.

The non-linear and linear parity check functions may incorporate a modulo operation that ensures that the amplitude of parity samples (values) will be maintained in a limited range to avoid peaks and potential overflows. The modulo operation may be operated in a two dimensional (2D), I-Q, domain. The power of the parity samples may be optimized for best sequence estimation and/or best symbol error rate SER performance.

In operation, the transmitter 150 may be operable to insert or embed parity samples into a stream of information symbols in an inter-symbol correlated (ISC) signal. The transmitter 150 may transmit the ISC signal comprising the resulting stream of information symbols and the inserted parity samples. When the transmitted ISC signal comprising the corresponding information symbols and inserted parity samples are received by a receiver such as the receiver 160, the inserted parity samples may be utilized to generate estimates of the corresponding information symbols that were transmitted by the transmitter 150. In other words, when the resulting stream of information symbols comprising the inserted parity samples are received by a receiver 160, the receiver 160 may utilize the parity samples to generate estimates of the information symbols.

The information symbols may be pulse shaped by a first pulse shaping filter characterized by a first response. The parity samples may be pulsed shaped by a second pulse shaping filter characterized by a second response. The first response and the second response may be diverse or uncorrelated. For example, the first response may be a high-pass response and the second response may be a low-pass response, although other diverse responses are contemplated. The transmitter 150 may be operable to transmit the inter-symbol correlated signal comprising the pulse shaped information symbols and the pulse shaped parity samples. In one aspect of the disclosure, a power of the parity samples may be optimized for best sequence estimation and for best symbol error rate (SER) performance.

The parity samples may be generated utilizing a parity function, which may also be referred to as a parity check function. The parity function may comprise a linear or a non-linear function. The parity function may utilize a non-linear function over a plurality of information symbols and the non-linear function may be diverse from a partial response signal convolution corresponding to the information symbols. In various aspects of the disclosure, the parity function may be designed according to a desired SNR range at a receiver. The parity function may incorporate a memory depth, which may be larger than a memory of a partial response corresponding to taps of the first pulse shaping filter. The parity function may operate over adjacent and/or non-adjacent information symbols. The corresponding separation of the adjacent and/or non-adjacent information symbols may be uniformly and/or non-uniformly distributed. The corresponding intervals among the adjacent and/or non-adjacent information symbols are dependent on a length of an error event and/or an SNR operating range.

In accordance with an embodiment of the disclosure, the parity samples may be inserted between consecutive ones of the information symbols to generate a combined stream. The combined stream may be convolved with corresponding taps of the first pulse shaping filter.

The non-linear function and/or a linear function utilized for the parity check incorporates a modulo operation that ensures that an amplitude of corresponding values of parity samples are maintained in a particular range. The modulo operation may operate in a two dimensional (2D) domain. FIG. 1 and its corresponding description provide additional details of one example of the operation of the modulator or transmitter 150. Additional details regarding FIG. 1 are found in FIGS. 2-7E.

Figure 8B:
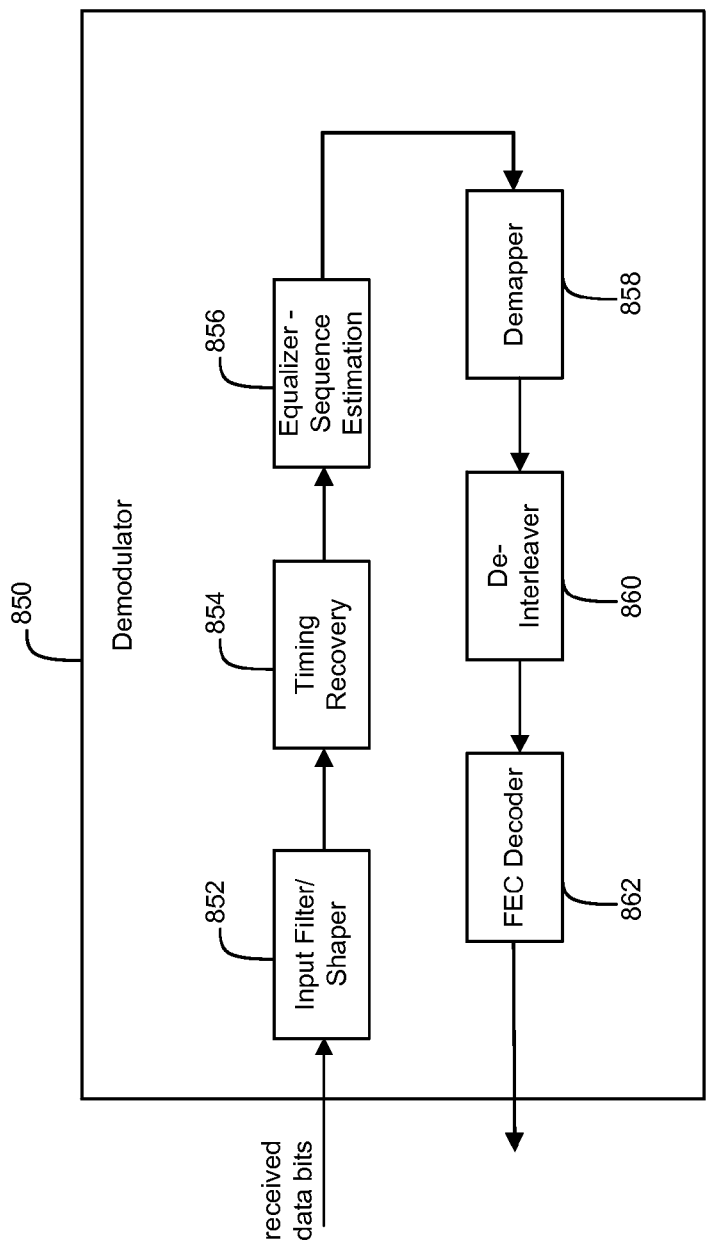
FIG. 8B is a block diagram illustrating an exemplary portion of a data path for a demodulator that is operable to provide parity check in the symbol domain for use in low complexity highly-spectrally efficient communication, in accordance with an embodiment of the disclosure.

FIG. 8B is a block diagram illustrating an exemplary portion of a data path for a demodulator that is operable to provide parity check in the symbol domain for use in low complexity highly-spectrally efficient communication, in accordance with an embodiment of the disclosure. Referring to FIG. 8B, there is shown a demodulator or receiver 850. The demodulator or receiver 850 may comprise an input filter/shaper 852, a timing recovery module 854, an equalizer and sequence estimation module 856, a demapper 858, a deinterleaver 860 and a FEC decoder 862. It should be recognized that the demodulator or receiver 850 may comprise other modules, functionality and/or components, which are not illustrated in FIG. 8B. For example, the demodulator or receiver 850 may comprise a receive front, which is not shown in FIG. 8B. FIGS. 1-7E provides some additional details of an exemplary demodulator or receiver 850, which is illustrated in FIG. 8A. In this regard, for example, the demodulator or receiver 160 of FIG. 1 provides more details of one example of the demodulator or receiver 850 of FIG. 8B.

The input filter/shaper 852 may comprise suitable logic, circuitry, interfaces and/or code that may be operable to perform an optimal blend between noise rejection, match filtering and/or non-linear observation. In this regard, the input filter/shaper 852 is operable to filter out and reject out-of-band (OOB) noise. In order to provide an optimal blend between noise rejection and match filtering, constraints may be added for the noise rejection functionality and the match filtering may be optimized accordingly, and/or constraints may be added for the match filtering and the noise rejection may be optimized accordingly. Since pulse shaping is achieved by the partial response shaper 808 in the transmitter or modulator 800, the taps of the input filter/shaper 852 may be configured so as to retain the inherent ISI characteristics of the received signal. The input filter/shaper 852 may be substantially similar to the input filter 109, an example of which is shown in FIG. 1.

In some embodiments of the disclosure, the task of pulse shaping may be split between the modulator 800 and the demodulator 850. In such instances, the input filter/shaper 852 may be operable to perform filtering or shaping of the received symbols, in order to provide the desired spectral shape, while concurrently incorporating severe inter-symbol interference (ISI).

The timing recovery module 854 may comprise suitable logic, circuitry, interfaces and/or code that may be operable to provide timing recovery for the symbols. In this regard, the timing recovery module 854 is operable to extract the symbol timing from the filtered signal to enable proper demodulation of the received signal. Due to the partial response pulse shape filtering, significant information related to symbol timing recovery may be lost and timing recovery may be challenging, especially in low SNR conditions. The timing recovery module 854 is operable to perform retiming of the signal and may decimate sampling rate down to x1 or x2 of the baud rate. The decimation sampling rate may be dependent on the type of equalizer being utilized, for example, T-spaced or fractionally spaced. The input filter/shaper 852 may be substantially similar to the timing pilot remove module 110, an example of which is shown in FIG. 1.

The equalizer and sequence estimation (SE) module 856 may comprise suitable logic, circuitry, interfaces and/or code that may be operable to provide equalization and sequence estimation of the symbols. The equalizer and sequence estimation module 856 is a core portion of the demodulator 850. In accordance with an embodiment of the disclosure, the equalizer and sequence estimation module 856 is operable to perform adaptive channel equalization with joint estimation of the symbols and phase noise. During sequence estimation decoding by the equalizer and sequence estimation (SE) module 856, in demodulator 850, one or more error events may be generated, which may comprise symbols that may degrade FEC decoding performance.

The equalizer and sequence estimation (SE) module 856 may also be operable to utilize the parity that is embedded in the symbol stream along with a parity function to generate a parity metric. The parity function utilized by the equalizer and sequence estimation (SE) module 856 corresponds to the parity function utilized by the PR shaper 808 in the modulator or transmitter 800. In this regard, in an aspect of the disclosure, the parity is being utilized in the symbol domain in the demodulator or receiver 850. The equalizer and sequence estimation (SE) module 856 in the demodulator or receiver 850 may be operable to utilize the parity function over at least a portion (e.g., an observation region, described below) of one or more symbol candidates and/or symbol survivors to generate the parity metric, which may reflect a match of the one or more symbol candidates and/or symbol survivors to the parity function (i.e., a high parity metric may indicate that the estimated values of the symbol survivor are likely correct). The use of the parity check in the symbol domain improves the stability and performance of sequence estimation around the threshold SNR and/or decreases complexity of the demodulator or receiver 850 by reducing the number of survivors that maintain performance. The parity metrics may be combined with the information symbols metrics (e.g., the legacy ML based sequence estimation metric) to generate a super metric. The super metrics may be a linear combination of the parity and information metrics or a non-linear combination. Either the parameters of the linear and the non-linear combination functions may vary based on dynamic conditions and performance indicators such as SNR, SER, BER, channel response (e.g., multipath), etc. The equalizer and sequence estimation (SE) module 856 may be substantially similar to the equalizer and sequence estimation (EQ. & Seq. Est.) module 112, an example of which is shown in FIG. 1.

The demapper 858 may comprise suitable logic, circuitry, interfaces and/or code that may be operable to convert or map the equalized signals comprising estimated symbols back to bits. The demapper 858 may be substantially similar to the equalizer and demapper 114, an example of which is shown in FIG. 1.

The deinterleaver 860 may comprise suitable logic, circuitry, interfaces and/or code that may be operable to despread the demapped bits using the reverse spreading algorithm that was utilized by the interleaver 804. The deinterleaver 860 may be optional. In instances where no interleaving is done in the modulator or transmitter 800, then the deinterleaver 860 is not utilized.

The FEC decoder 862 may comprise suitable logic, circuitry, interfaces and/or code that may be operable to perform FEC decoding of the resulting deinterleaved bits from the deinterleaver 860 in order to correct any bit errors. In this regard, the FEC decoder 862 is operable to utilize a complementary FEC decoding algorithm to that which was utilized for FEC encoding by the FEC encoder 802. For example, if the FEC encoder utilized LDPC, then the FEC decoder 862 utilizes the low density parity check bits that were generated by the FEC encoder 802 in the modulator or transmitter 800 to correct bit errors. In accordance with an exemplary aspect of the disclosure, the Shannon capacity bound may almost be met by using a high rate FEC (e.g. 0.9, 0.95).

In operation, the demodulator or receiver 850 synchronizes to the pilot location in the received symbol stream in order to demodulate the received symbol stream, which comprises the parity values. The input filter/shaper 852 may be configured with suitable coefficients to filter out and reject out-of-band (OOB) noise and/or provide pulse shaping. The input filter/shaper 852 may also be operable to filter the signal in order to incorporate severe inter-symbol interference. The equalizer and sequence estimation (SE) module 856 in the demodulator or receiver 850 may be operable to utilize the parity function over at least a portion (e.g., an observation region, as described below) of one or more symbol candidates and/or symbol survivors to generate a corresponding one or more parity metrics that may reflect a match of the path to the parity function. The parity metric(s) may be utilized together with one or more ML decoding metrics (e.g., the metrics $D_n^1$ ... $D_n^{M \times Su \times P}$ described above with reference to FIG. 4) to yield a super metric, which may be utilized by the equalizer and sequence estimation (SE) module 856 to select the best symbol candidate(s) and/or symbol survivor(s). The super metric may be a linear or non-linear function, time varying and may depend on signal to noise ratio (SNR), symbol error rate (SER), bit error rate (BER), packet error rate (PER) and/or any other channel parameters. The resulting symbols from the output of the input filter/shaper 852 may be communicated to the timing recovery module 854.

The timing recovery module 854 may be operable to recover corresponding timing information from the symbols and perform retiming of the symbols. In this regard, the timing recovery module 854 may be operable to lock to the timing pilot signal, which was inserted or embedded by the pilot insertion circuit 105 (FIG. 1) in order to recover the symbol timing of the received signal. The equalizer and sequence estimation module 856 may be operable to receive the symbols generated by the timing recovery module 854 and perform adaptive channel equalization with joint estimation of the symbols and phase noise. The demapper 858 then maps the resulting symbols from the equalizer and sequence estimation module 856 to bits. The deinterleaver 860 may be operable to despread the demapped bits using the reverse spreading algorithm that was utilized by the interleaver 804 in the modulator or transmitter 800. The output bits from the deinterleaver 860 may be communicated to the FEC decoder 862, which utilizes a FEC algorithm to correct any bit errors that may have occurred during transmission.

FIG. 1 and its corresponding description provides additional details of the operation of one example of the demodulator or receiver 160. Additional details regarding FIG. 1 are found in FIGS. 2-7E.

Certain embodiments of the method and system for forward error correction decoding with parity check for use in low complexity highly-spectrally efficient communications may comprise a demodulator 850 that is operable to receive a partial response signal comprising partial response symbols and parity. The demodulator 850 may be operable to decode the received partial response signal comprising the information symbols utilizing the parity in a symbol domain. In this regard, in an aspect of the disclosure, the parity was added in the symbol domain in the modulator or transmitter 800. The parity check samples were generated by a passage of corresponding information symbols through a partial response pulse shaping filter and/or a non-linear circuit at the modulator 800. Parity symbols may be defined as information symbols that may be utilized for generating the parity samples by a parity function. The demodulator 850 may be operable to generate one or more maximum likelihood (ML) based decoding metrics for parity check samples. The received information symbols may be converted by the demodulator 850 to a corresponding bitstream.

The parity, a corresponding parity function and the corresponding information symbols, may be utilized to generate a parity metric for the partial response signal. In one embodiment of the disclosure, the demodulator 850 may be operable to ML decode the information symbols utilizing the generated one or more maximum likelihood decoding metrics and the generated parity metric. The generated one or more maximum likelihood based decoding metrics and the generated parity metric may be uncorrelated. In another embodiment of the disclosure, the generated one or more maximum likelihood based decoding metrics and the generated parity metric may be utilized by the demodulator 850 to generate a new metric. In this regard, the partial response symbols may be decoded utilizing the new metric. Decoding using parity may continue until path convergence. The parity metrics may be combined with the information symbols metrics (e.g., the legacy ML based sequence estimation metric) to generate a super metric. The super metrics may be a linear combination of the parity and information metrics or a non-linear combination. Either the parameters of linear and the non-linear combination functions may vary based on dynamic conditions and performance indicators such as SNR, SER, BER, channel response (e.g., multipath), etc.

In accordance with another embodiment of the disclosure, in a modulator or transmitter 150, one or more processors and/or circuits comprising an FEC encoder is operable to generate forward error correction (FEC) codewords for an input bitstream. The one or more processors and/or circuits may comprise an interleaver 804 that is operable to spread the FEC codewords. The one or more processors and/or circuits may comprise a mapper 806 that is operable to map the FEC codewords to generate the symbols. The one or more processors and/or circuits are operable to generate parity for the filtered symbols in a symbol domain and communicate signals representative of the filtered symbols with the generated parity over a communication channel. In this regard instead of generating parity in the bit domain, the disclosure provides generation of parity in the symbol domain. FIG. 1 illustrates the bit domain and the symbol domain. The one or more processors and/or circuits are operable to filter a signal comprising the generated symbols to spectrally shape the signal for transmission, while concurrently incorporating the severe inter-symbol interference (ISI).

In various embodiments of the disclosure, a receiver 160 may be operable to receive an inter-symbol correlated (ISC) signal with information symbols and a corresponding parity symbol and estimate values of information symbols utilizing the parity symbols. The receiver 160 is also operable to generate one or more maximum likelihood (ML) based decoding metrics for the information symbols and one or more estimations for the information symbols based on the one or more ML based decoding metrics. The receiver 160 may be operable to generate a parity metric for each of the one or more generated estimations of the information symbols. The receiver 160 is operable to generate the parity metric by summing a plurality of values of one of the generated estimations to generate a sum. The receiver 160 is operable to wrapping the sum to generate a resulting parity check value that is within the boundaries of a symbol constellation, which is utilized to generate the information symbols. The receiver 160 is operable to select a best one or more of the generated estimations based on the generated one or more maximum likelihood decoding metrics and the generated parity metric. The receiver 160 is operable to combine the generated one or more maximum likelihood decoding metrics and the generated parity metric to generate a new metric. The receiver 160 utilizes the new metric to select the best one or more of the generated estimations. The generated one or more maximum likelihood based decoding metrics and the generated parity metric may be diverse or uncorrelated.

Figure 9:
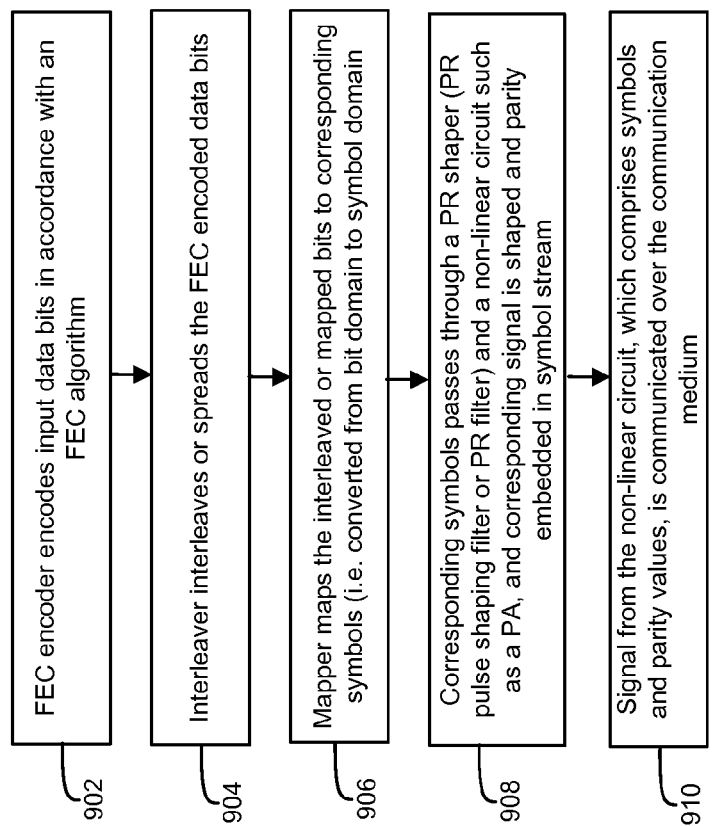
FIG. 9 is a flow chart illustrating exemplary steps for inserting parity in a symbol domain in a modulator, in accordance with an embodiment of the disclosure.

FIG. 9 is a flow chart illustrating exemplary steps for inserting parity in a symbol domain in a modulator, in accordance with an embodiment of the disclosure. Referring to FIG. 9, there is shown exemplary steps 902 to 910. In step 902, the FEC encoder 802 is operable to encode input data bits. In this regard, the input data bits may be encoded in accordance with an FEC algorithm such as LDPC or Reed Solomon encoding. In step 904, the interleaver 804 is operable to interleave or spread the FEC encoded data bits. In step 906, the mapper 806 is operable to map the interleaved or mapped bits to corresponding symbols. In other words, the corresponding information is converted from the bit domain to the symbol domain.

In step 908, the corresponding symbols from the mapper 806 passes through a PR shaper 808 (PR pulse shaping filter or PR filter) and a non-linear circuit such as a power amplifier (PA), and corresponding symbol are shaped and corresponding parity may be embedded in the symbol stream. In step 910, the signal resulting from the non-linear circuit, which comprises symbols and parity values, is communicated over the communication medium via the modulator 800.

Figure 10:
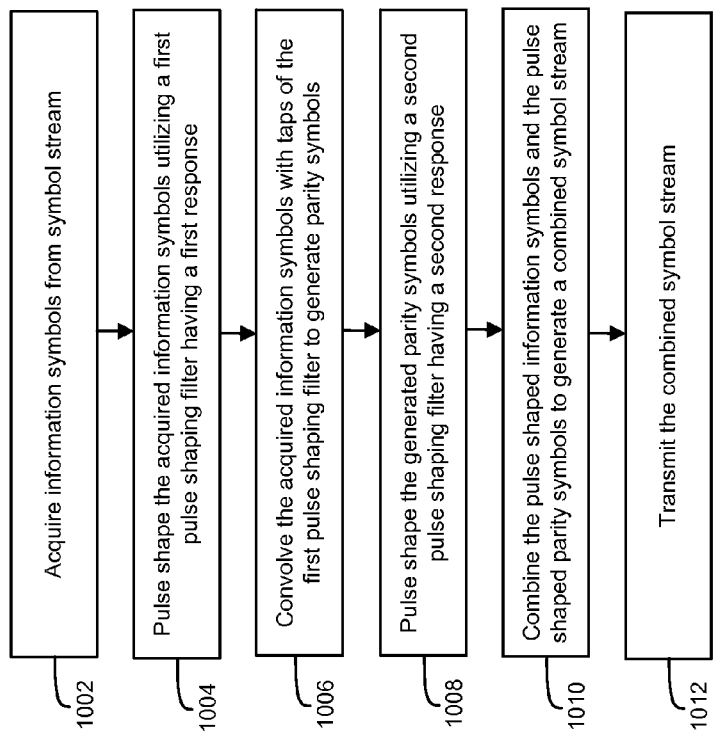
FIG. 10 is a flowchart illustrating exemplary steps for generating a transmit signal with parity that is inserted in a symbol domain in a modulator, in accordance with an embodiment of the disclosure.

FIG. 10 is a flowchart illustrating exemplary steps for generating a transmit signal with parity that is inserted in a symbol domain in a modulator, in accordance with an embodiment of the disclosure. Referring to FIG. 10, there is shown exemplary steps 1002 to 1012. In step 1002, information symbols are acquired from the symbol stream. In step 1004, the acquired information symbols are pulse shaped utilizing a first pulse shaping filter having a first response. In step 1006, the acquired information symbols are convolved with taps of the first pulse shaping filter to generate parity samples (values). In step 1008, the generated parity samples are pulse shaped utilizing a second pulse shaping filter having a second response. In step 1010, the pulse shaped information symbols and the pulse shaped parity samples are combined to generate a combined symbol stream. In step 1012, the combined symbol stream is transmitted.

In various embodiments of the disclosure, in a transmitter 150, parity samples may be inserted or embedded into a stream of information symbols in an inter-symbol correlated (ISC) signal. The transmitter 150 may transmit the ISC signal comprising the resulting stream of information symbols and the inserted parity samples. When the transmitted ISC signal comprising the corresponding information symbols and inserted parity samples are received by a receiver such as the receiver 160, the inserted parity samples may be utilized to generate estimates of the corresponding information symbols that were transmitted by the transmitter 150. In other words, when the resulting stream of information symbols comprising the inserted parity samples are received by a receiver 160, the receiver 160 may utilize the parity samples to generate estimates of the information symbols.

The information symbols may be pulse shaped by a first pulse shaping filter characterized by a first response. The parity samples may be pulsed shaped by a second pulse shaping filter characterized by a second response. The first response and the second response may be diverse or uncorrelated. For example, the first response may be a high-pass response and the second response may be a low-pass response, although other diverse responses are contemplated. The transmitter 150 may be operable to transmit the inter-symbol correlated signal comprising the pulse shaped information symbols and the pulse shaped parity samples. In one aspect of the disclosure, a power of the parity samples may be optimized for best sequence estimation and for best symbol error rate (SER) performance.

The parity samples may be generated utilizing a parity function, which may also be referred to as a parity check function. The parity function may comprise a linear or a non-linear function. The parity function may utilize a non-linear function over a plurality of information symbols and the non-linear function may be diverse from a partial response signal convolution corresponding to the information symbols. In various aspects of the disclosure, the parity function may be designed according to a desired SNR range at a receiver. The parity function may incorporate a memory depth, which may be larger than a memory of a partial response corresponding to taps of the first pulse shaping filter. The parity function may operate over adjacent and/or non-adjacent information symbols. The corresponding separation of the adjacent and/or non-adjacent information symbols may be uniformly and/or non-uniformly distributed. The corresponding intervals among the adjacent and/or non-adjacent information symbols are dependent on a length of an error event and/or an SNR operating range.

In accordance with an embodiment of the disclosure, the transmitter 150 may be operable to receive feedback data from the receiver 160 and make adjustments to one or more components and/or functions of the transmitter 150 based on the received feedback data. Exemplary data that may be fed back from the receiver 160 to the transmitter 160 may comprise SNR, SER, BER and/or channel response such as multipath. In an exemplary embodiment of the disclosure, the transmitter 150 may be operable to receive feedback data, from the receiver 160, comprising one or more of SNR, SER and/or BER. In this regard, based on one or more of the received SNR, SER and/or BER, the transmitter 150 may adjust parameters for the parity function. For example, the transmitter may adjust a non-linear parity function based on one or more of the received SNR, SER and/or BER. Additional details may be found in, for example, the United States Application titled "Method and System for Forward Error Correction Decoding with Parity Check for Use in Low Complexity Highly-Spectrally Efficient Communications," which is incorporated herein by reference, as set forth above.

In accordance with an embodiment of the disclosure, the parity samples may be inserted between consecutive ones of the information symbols to generate a combined stream. The combined stream may be convolved with corresponding taps of the first pulse shaping filter.

The non-linear function and/or a linear function utilized for the parity check incorporates a modulo operation that ensures that an amplitude of corresponding values of parity samples are maintained in a particular range. The modulo operation may operate in a two dimensional (2D) domain.

A parity metric may be generated from the inserted parity samples and the generated parity metric may be utilized to select a best one or more of the generated estimates of the corresponding received information symbols. The parity samples may be mapped into symbols to become parity symbols. A slicing function may be utilized to slice or map the parity samples into corresponding parity symbols. The parity symbols may be related to an N-QAM constellation where N is a positive multiplication of 2 that may be the same as that which may be utilized for the information symbols. The disclosure is not limited in this regard and a different constellation may be utilized.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within the transmitter 150 and/or receiver 160 may be configured or reconfigured based on, for example, current, recently received and/or updated signals, information and/or data.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for forward error correction encoding with parity check for use in low complexity highly-spectrally efficient communications.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a transmitter:
   inserting parity samples into a stream of information symbols in an inter-symbol correlated (ISC) signal, wherein said inserted parity samples are utilized to generate estimates of corresponding received information symbols;
   pulse shaping said information symbols by a first pulse shaping filter characterized by a first response;

pulse shaping said parity samples by a second pulse shaping filter characterized by a second response, wherein said first response and said second response are diverse; and generating said parity samples utilizing a parity function over a plurality of said information symbols;

wherein:

said parity function comprises a non-linear function, and said non-linear function is diverse from a partial response signal convolution corresponding to said information symbols; and said parity function is determined according to a desired SNR range at a receiver.

2. A method comprising:

in a transmitter:

inserting parity samples into a stream of information symbols in an inter-symbol correlated (ISC) signal, wherein said inserted parity samples are utilized to generate estimates of corresponding received information symbols;

pulse shaping said information symbols by a first pulse shaping filter characterized by a first response;

pulse shaping said parity samples by a second pulse shaping filter characterized by a second response, wherein said first response and said second response are diverse; and transmitting said inter-symbol correlated signal comprising said pulse shaped information symbols and said pulse shaped parity samples, wherein a power of said parity samples is optimized for best sequence estimation and best symbol error rate (SER) performance.

3. The method according to claim 2, comprising generating said parity samples utilizing a parity function over a plurality of said information symbols.

4. The method according to claim 3, wherein:

said parity function comprises a non-linear function, and said non-linear function is diverse from a partial response signal convolution corresponding to said information symbols; and said parity function is designed according to a desired SNR range at a receiver.

5. The method according to claim 3, wherein said parity function incorporates a memory depth, which is larger than a memory of a partial response corresponding to taps of said first pulse shaping filter.

6. The method according to claim 5, wherein:

said parity function operates over adjacent ones of said information symbols; and corresponding intervals among said adjacent information symbols are dependent on one or both of: a length of an error event and an SNR operating range.

7. The method according to claim 2, comprising:

inserting said parity samples between consecutive ones of said information symbols to generate a combined stream; and convolving said combined stream with corresponding taps of said first pulse shaping filter.

8. The method according to claim 2, wherein a parity metric is generated from said inserted parity samples, and said generated parity metric is utilized to select a best one or more of said generated estimates of said corresponding received information symbols and/or a best one or more paths of said corresponding information symbols.

9. A method comprising:

in a transmitter:

inserting parity samples into a stream of information symbols in an inter-symbol correlated (ISC) signal, wherein said inserted parity samples are utilized to generate estimates of corresponding received information symbols;

pulse shaping said information symbols by a first pulse shaping filter characterized by a first response;

pulse shaping said parity samples by a second pulse shaping filter characterized by a second response, wherein said first response and said second response are diverse;

generating said parity samples utilizing a parity function over a plurality of said information symbols; and wherein:

said parity function incorporates a memory depth, which is larger than a memory of a partial response corresponding to taps of said first pulse shaping filter;

a non-linear function and/or a linear function utilized for said parity function incorporates a modulo operation that ensures that an amplitude of corresponding values of parity samples are maintained in a particular range; and said modulo operation operates in a two dimensional (2D) domain.

10. A system, comprising:

one or more processors and/or circuits for use in a transmitter, said one or more processors and/or circuits being operable to:

insert parity samples into a stream of information symbols in an inter-symbol correlated (ISC) signal, wherein said inserted parity samples are utilized to generate estimates of corresponding received information symbols; and generate said parity samples utilizing a parity function over a plurality of said information symbols;

wherein:

said one or more processors and/or circuits comprise a first pulse shape filter characterized by a first response, said first pulse shaping filter being operable to pulse shape said information symbols;

said one or more processors and/or circuits comprise a second pulse shaping filter characterized by a second response, said second pulse shaping filter being operable to pulse shape said parity samples;

said parity function comprises a non-linear function, and said non-linear function is diverse from a partial response signal convolution corresponding to said information symbols; and said parity function is designed according to a desired SNR range at a receiver.

11. A system comprising:

one or more processors and/or circuits for use in a transmitter, wherein:

said one or more processors and/or circuits are operable to insert parity samples into a stream of information symbols in an inter-symbol correlated (ISC) signal, wherein said inserted parity samples are utilized to generate estimates of corresponding received information symbols;

said one or more processors and/or circuits are operable to transmit said inter-symbol correlated signal comprising said pulse shaped information symbols and said pulse shaped parity samples, wherein a power of said parity samples is optimized for best sequence estimation and best symbol error rate (SER) performance;

said one or more processors and/or circuits comprise a first pulse shape filter characterized by a first response, said first pulse shaping filter being operable to pulse shape said information symbols; and said one or more processors and/or circuits comprise a second pulse shaping filter characterized by a second response, said second pulse shaping filter being operable to pulse shape said parity samples.

12. The system according to claim 11, wherein said one or more processors and/or circuits are operable to generate said parity samples utilizing a parity function over a plurality of said information symbols.

13. The system according to claim 12, wherein:

said parity function comprises a non-linear function, and said non-linear function is diverse from a partial response signal convolution corresponding to said information symbols; and said parity function is designed according to a desired SNR range at a receiver.

14. The system according to claim 12, wherein said parity function incorporates a memory depth, which is larger than a memory of a partial response corresponding to taps of said first pulse shaping filter.

15. The system according to claim 14, wherein:

said parity function operates over adjacent information symbols; and corresponding intervals among said adjacent information symbols are dependent on one or both of: a length of an error event and/or an SNR operating range.

16. The system according to claim 11, wherein said one or more processors and/or circuits are operable to:

insert said parity samples between consecutive ones of said information symbols to generate a combined stream; and convolve said combined stream with corresponding taps of said first pulse shaping filter.

17. The system according to claim 11, wherein a parity metric is generated from said inserted parity samples, and said generated parity metric is utilized to select a best one or more of said generated estimates of said corresponding received information symbols and/or a best one or more paths of said corresponding information symbols.

18. A system comprising:

one or more processors and/or circuits for use in a transmitter, wherein:

said one or more processors and/or circuits are operable to insert parity samples into a stream of information symbols in an inter-symbol correlated (ISC) signal, wherein said inserted parity samples are utilized to generate estimates of corresponding received information symbols;

said one or more processors and/or circuits are operable to generate said parity samples utilizing a parity function over a plurality of said information symbols;

said one or more processors and/or circuits comprise a first pulse shape filter characterized by a first response, said first pulse shaping filter being operable to pulse shape said information symbols;

said one or more processors and/or circuits comprise a second pulse shaping filter characterized by a second response, said second pulse shaping filter being operable to pulse shape said parity samples;

said parity function incorporates a memory depth, which is larger than a memory of a partial response corresponding to taps of said first pulse shaping filter;

a non-linear function and/or a linear function utilized for said parity function incorporates a modulo operation that ensures that an amplitude of corresponding values of parity samples are maintained in a particular range; and said modulo operation operates in a two dimensional (2D) domain.

* * * * *